United States Patent
Ilic et al.

(10) Patent No.: US 10,128,658 B2
(45) Date of Patent: Nov. 13, 2018

(54) AUTONOMOUS METHODS, SYSTEMS, AND SOFTWARE FOR SELF-ADJUSTING GENERATION, DEMAND, AND/OR LINE FLOWS/REACTANCES TO ENSURE FEASIBLE AC POWER FLOW

(71) Applicant: Carnegie Mellon University, Pittsburgh, PA (US)

(72) Inventors: Marija Ilic, Sudbury, MA (US); Andrew Hsu, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 710 days.

(21) Appl. No.: 14/307,145

(22) Filed: Jun. 17, 2014

(65) Prior Publication Data
US 2014/0371940 A1     Dec. 18, 2014

Related U.S. Application Data

(60) Provisional application No. 61/956,840, filed on Jun. 17, 2013.

(51) Int. Cl.
H02J 3/38     (2006.01)
H02J 3/00     (2006.01)

(52) U.S. Cl.
CPC ........... *H02J 3/38* (2013.01); *H02J 2003/007* (2013.01); *Y02E 60/76* (2013.01); *Y04S 40/22* (2013.01)

(58) Field of Classification Search
CPC ........... B21J 15/142; B21J 15/28; G01B 3/28; G01B 5/18; H02J 2003/007; H02J 3/38; Y02E 60/76; Y04S 40/22

USPC ........................................................ 700/297
See application file for complete search history.

(56) References Cited

U.S. PATENT DOCUMENTS

| | | | |
|---|---|---|---|
| 5,566,085 A | 10/1996 | Marceau et al. | |
| 7,567,926 B2 * | 7/2009 | Alvarado | G06Q 40/00 705/35 |
| 7,660,649 B1 | 2/2010 | Hope et al. | |
| 2003/0200010 A1 | 10/2003 | Chiang et al. | |
| 2006/0229767 A1 | 10/2006 | Chu et al. | |

(Continued)

OTHER PUBLICATIONS

Author: Marija D. Ilic, Title: Toward Distributed Contingency Screening Using Line Flow Calculators and Dynamic Line Rating Unit (DLRs); IEEE conference, 2012 45th Hawaii Interfnational Conference on system Science; Date: Jan. 4-7, 2012.*

(Continued)

*Primary Examiner* — Robert E Fennema
*Assistant Examiner* — Marzia T Monty
(74) *Attorney, Agent, or Firm* — Downs Rachlin Martin PLLC

(57) ABSTRACT

Autonomous, self-adjusting, and distributed line flow processing for a network having nodes with branches coupling adjacent ones of the nodes and components coupled to the nodes. Systems, methods, and software made in accordance with this disclosure can be used to identify where power flows can exceed the maximum transfer limit in each line and to enable automated adjustments in order to avoid such conditions. These can be useful tools for both system operators of large electrical networks and for implementing automated schemes to ensure network feasibility in microgrids or other networks with many smart components embedded with communications and/or computation capabilities.

20 Claims, 14 Drawing Sheets

(56) References Cited

U.S. PATENT DOCUMENTS

| | | | |
|---|---|---|---|
| 2007/0027642 A1 | 2/2007 | Chu et al. | |
| 2007/0203658 A1 | 8/2007 | Patel | |
| 2007/0250217 A1 | 10/2007 | Yoon et al. | |
| 2008/0015721 A1* | 1/2008 | Spearman | G06Q 10/06 700/99 |
| 2008/0103737 A1 | 5/2008 | Yoon et al. | |
| 2009/0182518 A1 | 7/2009 | Chu et al. | |
| 2009/0326882 A1 | 12/2009 | Fang | |
| 2010/0114392 A1 | 5/2010 | Lancaster | |
| 2011/0196546 A1* | 8/2011 | Muller | H02J 3/383 700/295 |
| 2011/0213606 A1 | 9/2011 | Seaman et al. | |
| 2013/0024168 A1 | 1/2013 | Ilic et al. | |
| 2013/0184889 A1* | 7/2013 | Fan | H02J 3/00 700/292 |

OTHER PUBLICATIONS

Office Action dated May 7, 2014 in related U.S. Appl. No. 13/343,997, filed Jan. 5, 2012, Marija D. Ilic.

Ng, W. Y., "Generalized generation distribution factors for power systems security evaluations," IEEE Transactions on Power Apparatus and Systems, Mar. 1981, pp. 1001-1005.

Iljc-Spong, et al., "Redistribution of reactive power flow in contingency studies," IEEE Transactions on Power Apparatus and Systems, PWRS-1, Aug. 1986, pp. 266-275.

General Agreement on ParallelPaths Experiments (GAPP), FinalReport, Aug. 1999, 35 pages.

Jadbabaie, A., "A distributed Newton method for optimization," Proceedings of the 48th IEEE Conference on Decision and Control, Dec. 2009, pp. 2736-2741.

Boyd, S. et al., "Convex Optimization," Cambridge University Press, UK, 2004, 730 pages.

Donsion, M.P., "UPFC (Unified Power Flow Controller)," Universidad de Vigo, Spain, Aug., 24, 2007, 17 pages.

Becker, S., "Convex Optimization: A light-speed introduction," Applied and ComputationalMathematics California Institute of Technology, Oct. 23, 2009, 66 pages.

Andrey Pazderin and Sergey Yuferev, "Power Flow Optimization by Compination of Nweton-Raphson Method and Newton's Method in Optimization" IEEE 2009, 978-1-4244-4649, pp. 1693-1696.

* cited by examiner

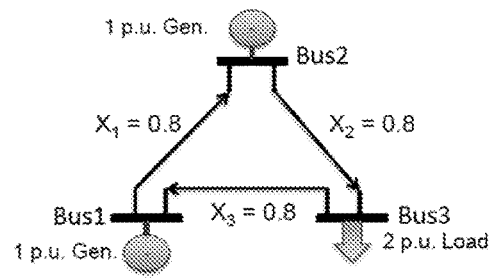
*FIG. 20A*
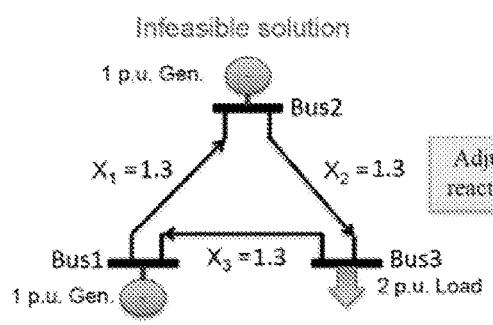 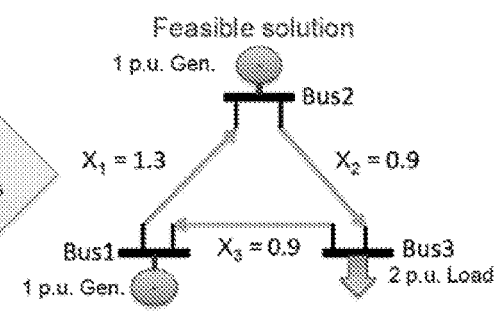
*FIG. 20B*     *FIG. 20C*
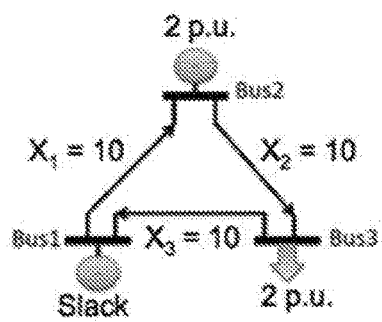 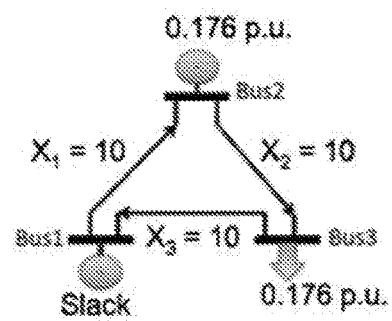
*FIG. 20D*     *FIG. 20E*

AUTONOMOUS METHODS, SYSTEMS, AND SOFTWARE FOR SELF-ADJUSTING GENERATION, DEMAND, AND/OR LINE FLOWS/REACTANCES TO ENSURE FEASIBLE AC POWER FLOW

RELATED APPLICATIONS

This application claims the benefit of the Provisional Patent Application Ser. No. 61/956,840, filed on Jun. 17, 2013, and titled "A METHOD FOR ADJUSTING GENERATION, DEMAND AND/OR LINE FLOWS/REACTANCES TO ENSURE FEASIBLE AC POWER FLOW," which is hereby incorporated herein by reference in its entirety.

FIELD OF THE INVENTION

The present invention generally relates to the field of electrical power generation and distribution. In particular, the present disclosure is directed to autonomous methods, systems, and software for self-adjusting generation, demand, and/or line flows/reactances to ensure feasible AC power flow.

BACKGROUND

Much has changed since the electric energy industry has introduced distribution factors-based methods for monitoring line flows in large electric energy grids. The industry currently lacks sharing of information between different utilities and control areas. As a consequence, often the least expensive and cleanest resources cannot be scheduled to avoid possible transmission line flow congestion due to lack of such information exchange. Moreover, much industry effort has gone toward tracking different power transactions in order to ensure that these do not create thermal line flow overloads, in particular, namely to ensure no (N−1) security problems. An electrical power system is N−1 secure if any single component in the electrical power system can fail without affecting service to the consumers for at least thirty minutes following the component failure. The hybrid approach to regulated transmission and competitive generation has created many financial distortions as well. Nevertheless, short of any other known way of ensuring most efficient utilization of transmission assets for enabling efficient energy resource utilization, transmission owners build assets, system operators dispatch power around the anticipated transmission congestion limitations and the congestion cost is not directly used to give incentives for reducing congestion in the future.

As these and similar problems continue to create operating and planning problems, very little rethinking of the overall approach to monitoring and managing transmission system congestion has been done. As a result, it has become practically impossible to reconcile the use of sensors and controllers of the individual equipment with the objectives of operating and planning an electrical power system according to the coarse scalar measures such as (N−1) security objectives. Many developers of high technologies with a potential for enhancing effectiveness of future power grid operations currently provide ready-to-use and cost-effective sensors, communications and decision tools with large computing power at the equipment level. The ultimate vision of micro-grids as almost entirely autonomous self-adjusting networks enabling utilization of many small distributed energy resources and meeting diverse energy needs of consumers has remained a remote dream given the wide gap between the methods used to monitor and manage resources and the methods which could be used to take advantage of smart distributed sensors and controllers.

Today's industry typically uses tools, such as distribution factors, to make adjustments to the system. The distribution factors measure how sensitive changes in each line's flow are to changes in each injection at the buses of the system. When generation is to be adjusted at individual buses, the change in each line flow can be inferred using the distribution factors, to check if line flows will violate line constraints, such as physical or thermal limits.

The power injections to the buses, denoted here as vector $P_g$, and the phase angles at the nodes denoted as vector $\theta$, then are related as follows:

$$P_g = B'\theta, \quad (1)$$

where $B'$ is a full susceptance matrix of the system. Since one nodal phase angle will be dependent on other nodal phase angles, the full susceptance matrix will be a singular matrix. The full susceptance matrix usually has the first row removed since a first node corresponds to a slack bus. The first column of the full susceptance matrix is removed as well.

On the other hand, the relationship between the nodal angles $\theta$ and the line flows $P_f$ can be written as $$P_f = DA\theta, \quad (2)$$

wherein D is a diagonal matrix whose diagonal elements are the negative of the susceptance of a line corresponding to an associated branch. The matrix A is the line-node incidence matrix. In combining the equation (1) and the equation (2), a relationship between $P_f$ and $P_g$ is expressed as $$P_f = DAB'^{-1}P_g \quad (3)$$

Equation (3) shows the sensitivity of $P_f$ to $P_g$ for a given network, and it is routinely used by the industry to relate incremental changes in line flows created by the incremental changes in power injections. A matrix that relates $P_f$ to $P_g$ is often referred to as the distribution factors matrix. Network operators will need to know the entire A matrix as well as to invert the full susceptance matrix in order to perform a distribution factor calculation. Then, if thermal line flow constraints are violated, the network operators will need to adjust injections until the line constraints are no longer violated.

Currently, electric power systems operators use power flow calculation and state estimation based on measurements in order to ascertain the status of the network. The power flow calculations are performed using algorithms such as Newton Raphson method, which solve the power flow equations as a simultaneous equations problem. This is an iterative method that requires all the parameters of the network be known to the computation device.

SUMMARY OF THE DISCLOSURE

In one implementation, the present disclosure is directed to a machine-readable storage medium containing machine-executable instructions for performing a method of managing line flows in a network having nodes with lines coupling adjacent ones of the nodes and components coupled to the nodes, the method being executed in a line flow control system. The machine-executable instructions may comprise: a first set of machine-executable instructions for receiving an objective function having component variables, nodal output variables, and branch flow variables for the network;

a second set of machine-executable instructions for initializing the component variables, nodal output variables and branch flow variables with initial values; a third set of machine-executable instructions for calculating values for the branch flow variables using a distributed Newton method, and calculating values for the component variables and the nodal output variables using values calculated for the branch flow variables until the values of the component variables, the nodal output variables, and the branch flow variables converge within a predetermined threshold range; and a fourth set of machine-executable instructions for determining one or more adjustments to be made to one or more of injections at the nodes and reactances in the lines as a function of one or more variables calculated by the third set of machine-executable instructions.

In another implementation, the present disclosure is directed to a machine-readable storage medium containing machine-executable instructions for performing a method of managing line flows in a network having nodes with lines coupling adjacent ones of the nodes and components coupled to the nodes, the method being executed in a line flow control system. The machine-executable instructions may comprise: a first set of machine-executable instructions for monitoring a status of two or more of the nodes, lines, and components of the network; and a second set of machine-executable instructions for determining one or more adjustments to be made to one or more of injections at the nodes and reactances in the lines as a function of the monitoring.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 20A is a diagram of a feasible generation/transmission scenario;

FIG. 20B is a diagram of an infeasible generation/transmission scenario;

FIG. 20C is a diagram illustrating how aspects of the present disclosure can be used to adjust reactances to make the infeasible scenario of FIG. 20B become feasible;

FIG. 20D is a diagram of another infeasible generation/transmission scenario;

FIG. 20E is a diagram illustrating how aspects of the present disclosure can be used to adjust generators and loads to make the infeasible scenario of FIG. 20D become feasible;

DETAILED DESCRIPTION

Figure 1:
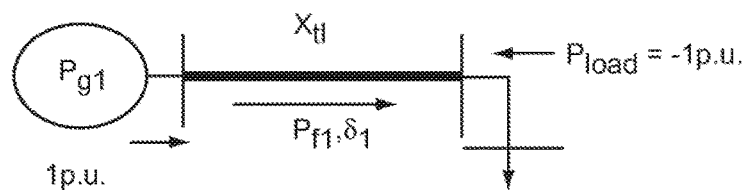
FIG. 1 is a single-line diagram depicting a simple two-bus power network.

The present disclosure relates to distributed line flow processing for a network having nodes with branches coupling adjacent ones of the nodes and components coupled to the nodes. In one embodiment, the processing includes receiving an objective function having component variables, nodal output variables, and branch flow variables for the network. Next, the component variables, nodal output variables, and branch flow variables are initialized with initial values, and then values for the branch flow variables are calculated using a distributed Newton method. Next, values for the component variables and the nodal output variables are calculated using values calculated for the branch flow variables until the values of the component variables, the nodal output variables, and the branch flow variables converge within a predetermined threshold range. In one embodiment, this system can be used to identify where power flows may exceed the maximum transfer limit in each line in order to enable automated adjustments to one or more electrical parameters, such as reactances, in one or more of said lines.

The present disclosure provides methods for computing of power generated, consumed, and delivered to ensure that an electric power grid can reliably and efficiently deliver power from generators to loads. One or more components (or groups of components) in a power system (e.g., generators, electricity consumers, and electric wires) may compute their impediments to AC power flow delivery to desired locations (e.g., loads) in the power grid by exchanging information with neighboring power grid components (or groups of components). A model-based protocol is described through which adjustments can be 'negotiated' such that a feasible AC power flow solution can be found in a distributed and/or autonomous manner. When the desired power flow delivery cannot be made without adjustments of generation, demand, and/or line characteristics, signals may be generated through the methods of the current disclosure and provided to a system operator and/or computer system in order to indicate the major bottlenecks and, optionally, to provide and/or implement plausible adjustments that can be made to overcome the limitations.

Methods of the present disclosure are particularly relevant for systematic deployment of distributed series reactances (DSRs) and other line flow controllable equipment. While current technology enables the control of reactances of individual power lines, their integration and control in a complex power grid must be done with a full understanding of their effects on line flow delivery. The present disclosure enables this type of system-wide control through the dynamic and/or autonomous control of one or more types of hardware (e.g., generation, demand, and wires). Methods of the present disclosure can be used in energy management centers by utility operators, embedded into and implemented by components or groups of components, and/or in a distributed fashion.

Distributed power flow methods allow power flow calculations to be carried out by components of the network, only requiring that they know their own parameters and communicate variables between themselves and their neighbors. In addition, this formulation of the power flow problem can tackle a problem known as power flow feasibility. Because power flow is modeled as a set of nonlinear equations, it is possible for there to be no solution, which results in a network being infeasible, or unable to be realized in the physical world. In other words, for the given network parameters, generation and load, there are no voltages for each bus that would result in power flow equations being satisfied.

One innovation of this disclosure is the ability to use Lagrange multipliers from the optimization formulation of the power flow problem to determine whether individual components can be adjusted so that the system can be rendered feasible. This can be demonstrated using adjustments to power injections and transmission line reactances, as discussed further hereinbelow. This innovation is very powerful as more components on the electric power grid become "smart," i.e., built with communications enabling them to be remotely controlled by a system operator or grid component, enabling communications and computations abilities.

The embodiments set forth below represent the necessary information to enable those skilled in the art to practice the embodiments and illustrate exemplary current best modes of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Aspects of the methods, systems, and software disclosed herein for distributed line flow computing and associated adjustments may also useful for solving various network optimization problems outside of power distribution. For example, aspects of the disclosure may be applied to transportation type networks wherein typically an analog of Kirchhoffs current law (KCL) must or should be satisfied.

When applied to electric power systems, the methods, systems, and software of the present disclosure must take conditions specific to electric power into account. The following description poses the problem of distributed line flow calculations as a distributed network optimization problem. A solution that takes into account and/or reflects the physical characteristics of one or more specific lines can be obtained by appropriately posing the optimization objective.

A. Problem Setup $P_f$: vector of power flows through lines between nodes, satisfying KCL;

$P_{phys}$: vector of power flows through lines between nodes, satisfying KVL and Ohm's law;

b: vector of injections leaving/entering the nodes $P_g$;

A: incidence matrix, N×B (node to branch);

$A_{ij}$: 1 if branch j leaves node i};

$A_{ij}$: −1 if branch j enters node i};

$A_{kvl}$: KVL Connectivity Matrix (Denotes which lines are in which algebraic loops);

$X_e$: reactance of line e;

$B_e$: susceptance of line e; and $\delta_e$: phase angle difference across line e.

B. Proposed Objective Function for an Electric Energy Network

For the method to be distributed, the chosen objective function should be in the form:

$$f(x) = \sum_{e=1}^{E} \phi_e(x_e), \qquad (4)$$

where x represents the vector of all line flows, $x_e$, to be optimized.

For the case of electric energy networks, x is defined as the vector of all the power line flows, $P_{f,e}$s, one for every line in the network. In order to satisfy all the constraints of the electric energy network, i.e., KCL, KVL, and Ohm's law, the objective function is chosen to minimize the difference between $P_f$ and $P_{phys}$. Recall that $P_f$ is calculated subject to KCL and that $P_{phys}$ is calculated subject to KVL and Ohm's law. The new optimization function is:

$$f(x) = \sum_{e=1}^{E} (P_{f,e} - P_{phys,e})^2. \tag{5}$$

In this optimization function, $P_{phys}$ would be updated between iterations via the phase angle difference between the ends of each line, so that it satisfies Ohm's law. Optimality conditions for the objection function chosen will ensure that $P_f$ and $P_{phys}$ align.

In the lossless, decoupled, real power formulation of power flow, $P_{phys}$ satisfies the following relationship with the phase angle across the line, $\delta$:

$$P_{Phys,e} = -B_e \sin(\delta_e) \tag{6}$$

C. KCL and KVL Constraints $$Ax = AP_f = b \tag{7}$$

Constraints are defined by the network graph. A, x, and b are defined above, and Equation (7) defines their relationship on the graph of the network. Each line calculates and stores its own flow ($P_{f,e}$) and receives the information about injections, ($b_i$), from nodes i to which they are connected. The A matrix is constant for a given topography and defines which injections are connected to which lines.

$$A_{kvl}\delta = 0. \tag{8}$$

In addition, every loop in a meshed network must satisfy Kirchhoff's voltage law, where the voltage phase angles must add up to zero around each loop of the network. This constraint is represented in Equation (8), which is satisfied if all linearly independent loops of the network are shown to satisfy KVL.

As a result of KVL, each basic loop of the network must have a loop coordinating scheme that calculates that sums the voltage phase angles of all the lines in each loop. It is known that any connected network, when represented as a graph, can form a tree from branches of the graph that connects every branch. All additional branches, or lines, of the network must necessarily form loops. This set of tree and non-tree lines only needs to be recalculated when there is a topology change. Non-tree lines can also be designated as loop coordinators.

D. Distributed Line Flow Computing as a Distributed Newton Optimization Method

The power flow balance in each line is represented as an objective function $f(P_f, \delta)$ in Equation (5), resulting in an optimization problem of the form:

$$\min_{P_f, \delta} f(P_f, \delta) = \sum_{e=1}^{E} (P_{f,e} + B_e \sin(\delta_e))^2 \tag{9}$$

$$\text{s.t. } A(P_f) = b. \tag{10}$$

$$A_{kvl}\delta = 0. \tag{11}$$

If the Lagrangian is written, introducing Lagrange multipliers v and w, the following algebraic relationship can be formed:

$$\mathfrak{S}(P_f, \delta, v, w) = f(P_f, \delta) + v^T(A(P_f) - b) + w^T(A_{kvl}\delta) \tag{12}$$

Variable v represents the nodal power mismatch from the solution and w the loop phase angle mismatch.

An approximate Hessian of this problem can be formed at each step k as:

$$J_k = \begin{bmatrix} \frac{\partial^2 \mathfrak{S}}{\partial P_f^2} & A^T & 0 & 0 \\ A & 0 & 0 & 0 \\ 0 & 0 & \frac{\partial^2 \mathfrak{S}}{\partial \delta^2} & A_{kvl}^T \\ 0 & 0 & A_{kvl} & 0 \end{bmatrix} \tag{13}$$

This is based on the decomposition assumption that the off diagonal terms have a negligible effect on Newton iterations, and are approximated to be zero. The following iterative steps can calculated at each step:

$$\begin{bmatrix} \Delta P_f \\ \Delta v \end{bmatrix}_k = -\begin{bmatrix} \frac{\partial^2 \mathfrak{S}}{\partial P_f^2} & A^T \\ A & 0 \end{bmatrix}_k^{-1} \begin{bmatrix} \frac{\partial \mathfrak{S}}{\partial P_f} \\ \frac{\partial \mathfrak{S}}{\partial v} \end{bmatrix}_k \tag{14}$$

$$\begin{bmatrix} \Delta \delta \\ \Delta w \end{bmatrix}_k = -\begin{bmatrix} \frac{\partial^2 \mathfrak{S}}{\partial \delta^2} & A_{kvl}^T \\ A_{kvl} & 0 \end{bmatrix}_k^{-1} \begin{bmatrix} \frac{\partial \mathfrak{S}}{\partial \delta} \\ \frac{\partial \mathfrak{S}}{\partial w} \end{bmatrix}_k \tag{15}$$

$\Delta P_f$ and $\Delta v$ can be solved for by algebraically deriving the equations (k subscript omitted) as:

$$\Delta P_f = -\left(\frac{\partial^2 \mathfrak{S}}{\partial P_f^2}\right)^{-1}\left(\frac{\partial \mathfrak{S}}{\partial P_f} + A^T v\right) \tag{16}$$

$$\Delta v = \left(\text{diag}\left(A\left(\frac{\partial^2 \mathfrak{S}}{\partial P_f^2}\right)^{-1} A^T\right)\right)^{-1} \left(\frac{\partial^2 \mathfrak{S}}{\partial P_f^2} - A\left(\frac{\partial \mathfrak{S}}{\partial v}\right)^{-1} \frac{\partial \mathfrak{S}}{\partial P_f}\right) \tag{17}$$

In this case, the inverse of matrix $$A\left(\frac{\partial^2 \mathfrak{S}}{\partial P_f^2}\right)^{-1} A^T$$

is approximated using the inverse of its diagonal elements, a zeroth order homotopy perturbation estimate of the inverse. Using this method insures that only local information is necessary to update variables. Nodes need access to information regarding the flows of neighboring lines, and lines need access to information regarding the Lagrange multiplier, v, of neighboring nodes.

The updates for v and w are solved using a similar set of equations as Equations (16) and (17), because the subproblem has a similar structure, as seen in Equations (14) and (15).

$$\Delta\delta = -\left(\frac{\partial^2 \Im}{\partial \delta^2}\right)^{-1}\left(\frac{\partial \Im}{\partial \delta} + A_{kvl}^T w\right) \quad (18)$$

$$\Delta w = \left(\text{diag}\left(A_{kvl}\left(\frac{\partial^2 \Im}{\partial \delta^2}\right)^{-1} A_{kvl}^T\right)\right)^{-1}\left(\frac{\partial^2 \Im}{\partial \delta^2} - A_{kvl}\left(\frac{\partial \Im}{\partial w}\right)^{-1}\frac{\partial \Im}{\partial \delta}\right) \quad (19)$$

$P_f$ is solved by using iteration steps calculated from equation 10:

$$P_{f,k+1} = P_{f,k} + \Delta P_{f,k} \quad (20)$$

Variables v, w and δ are all updated in the same way, using their respective iteration steps.

The communication between components can be summarized as follows: Each line can guess or estimate its line flow. It then calculates its $P_f$ and v locally, using Equation (14). In order to calculate δ and w, Equation (15) is used. It can then exchange that information with the nodes it is connected to. The nodes must wait for all lines to which they are connected to give them their local information in order to calculate v, while knowing their own injections. Each line in each basic loop of the graph must exchange δ and calculate w. The variables v and w are then sent back to the lines connected to that node, which allows each line to calculate an updated $P_f$. Each line can then update its own δ variables. Computing devices local to the lines and nodes can be programmed at minimum computing cost and can use existing or planned communications infrastructure.

Simulations have been run for three different small system configurations. The two node system represents the case for which calculations can be easily double checked, the three node two line system represents a small radial network, and the three node three line case represents a small mesh network. The expected values were calculated using the distribution factors method. The two-bus system is represented in FIG. 1. A single transmission line $X_{t1}$ is represented by a thick dark line, which indicates that $X_{t1}$ having a power flow $P_{f1}$ and a phase angle $\delta_1$ that must be updated. The transmission line couples a generator $P_{g1}$ that provides 1 p.u. to a load $P_{load}$ that absorbs −1 p.u.

The two bus system is the simplest possible electrical network. It consists of a generator, a load, and a transmission line. The system can be described as such:

$$P_f = [P_{f1}], \quad (21)$$

$$A = \begin{bmatrix} 1 \\ -1 \end{bmatrix}, \quad (22)$$

$$b = \begin{bmatrix} 1 \\ -1 \end{bmatrix}, \quad (23)$$

Simulations were done using several initial conditions. Due to space constraints only two cases are shown. The threshold for convergence in simulations was 0.001, though any appropriate, judiciously-chosen threshold may be utilized in particular implementations. The reactance of the transmission line was 0.1 p.u. The initial values were chosen as a random value from a uniform distribution between 0 p.u. and 1.5 p.u. which is within the expected range of the power flows.

TABLE 1

$P_{f1}$ FOR A SIMPLE TWO BUS NETWORK SYSTEM
Calculated Versus Expected Variable $P_{f1}$

| Case | $P_{f1\ init.}$ | $P_{f1\ fin.}$ | $P_{f1\ exp.}$ | Iter. |
|---|---|---|---|---|
| 1 | 1.030872 | 1.000460 | 1.0 | 2 |
| 2 | 0.791570 | 0.999814 | 1.0 | 2 |

Figure 2:
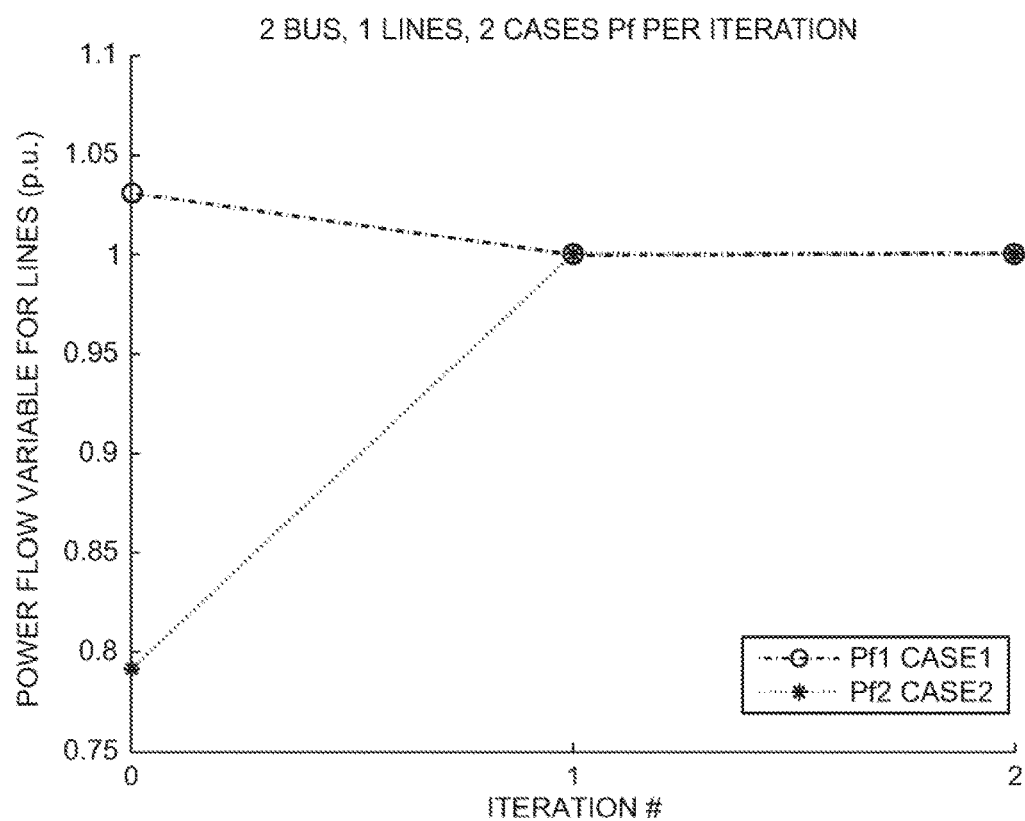
FIG. 2 is a graph of power flow ($P_f$) that satisfies Kirchhoff's current law (KCL) versus iterations for a simulation of the simple two-bus power network of FIG. 1 using distributed line flow computing according to the present disclosure.

FIG. 2 is a graph of power flow ($P_f$) that satisfies Kirchhoff's current law (KCL) versus iterations for a simulation of the simple two-bus power network of FIG. 1 using distributed line flow computing according to the present disclosure. In particular, the graph of FIG. 2 illustrates how each variable changes between iterations before convergence.

Figure 3:
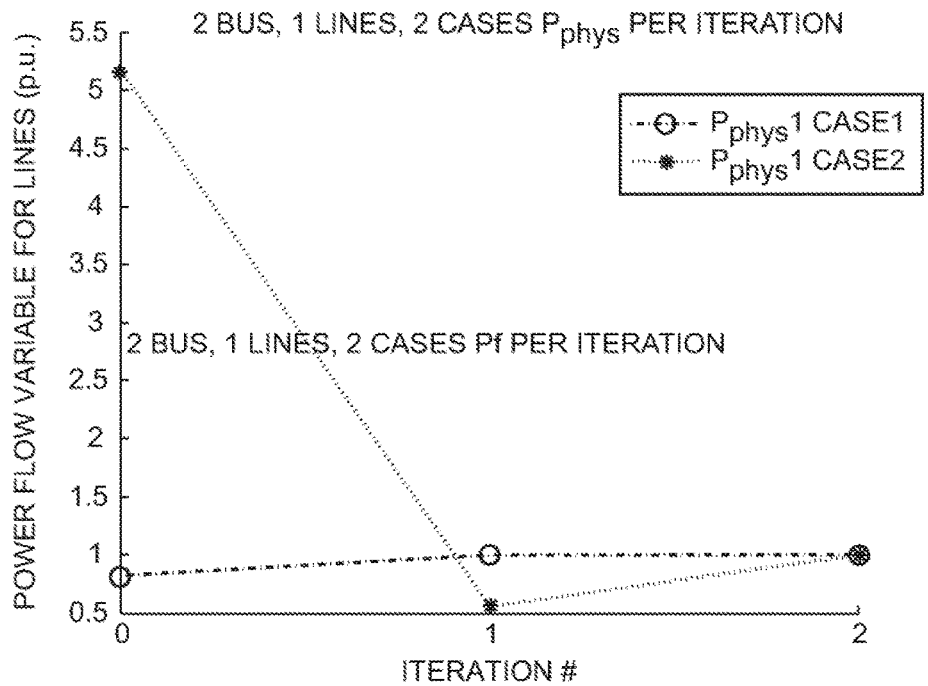
FIG. 3 is a graph of power flow ($P_{phys}$) that satisfies Kirchhoff's voltage law (KVL) and Ohm's law versus iterations for a simulation of the simple two-bus power network of FIG. 1 for two example cases using distributed line flow computing according to the present disclosure.
Figure 4:
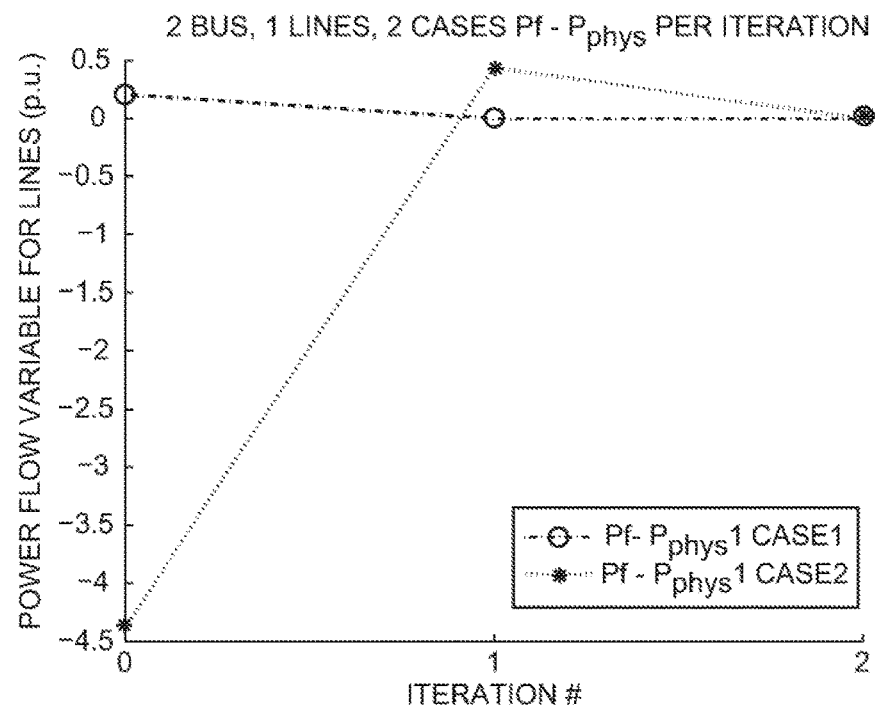
FIG. 4 is a graph of power flow ($P_{phys}$-$P_f$) versus iterations for a simulation of the simple two-bus power network of FIG. 1 for two example cases using distributed line flow computing according to the present disclosure.

FIG. 3 is a graph of power flow ($P_{phys}$) that satisfies Kirchhoff's voltage law (KVL) and Ohm's law versus iterations for a simulation of the simple two-bus power network of FIG. 1 for two example cases using distributed line flow computing according to the present disclosure. The iteration results of $P_f$ and $P_{phys}$ can be found in FIG. 2 to FIG. 4. This shows how each variable changed in between iterations, before converging. The difference between $P_f$ and $P_{phys}$ was also plotted to show that they become equal upon convergence as shown in FIG. 4. That indicates that the variable being optimized, $P_f$, approaches the power flow corresponding with the phase angle of the line, $P_{phys}$, which is iterated separately. Additionally, the differences between the expected and calculated values are very close, two to three orders of magnitude smaller than 1 p.u. This compares the solution found by conventional methods, such as distribution factors, to the final solution of the algorithm. The proposed algorithm took two iterations to complete for both sets of initial conditions chosen for this system configuration.

Figure 5:
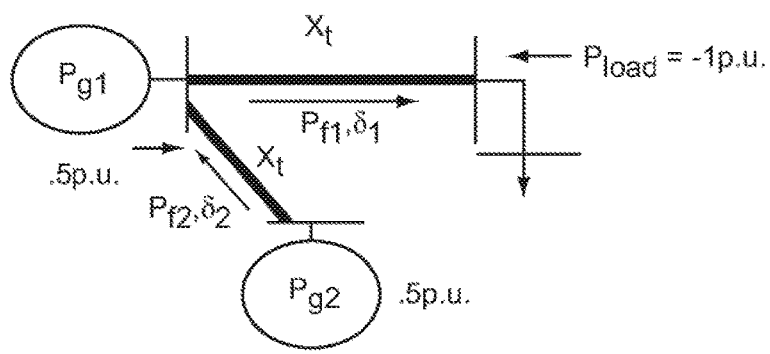
FIG. 5 is a single-line diagram depicting a simple radial power network.

FIG. 5 is a single-line diagram depicting a simple radial power network wherein there are no loops formed by the lines. Electric energy distribution networks tend to be radial networks. Similarly to the two bus case, the $P_f$ and $P_{phys}$ values are shown to converge, and be very close to the expected values. The A matrix and b vector reflect the fact that there are only two lines but three nodes, and the load is placed at one of the ends of the radial network. The other two nodes have generators, both producing 0.5 p.u. Transmission lines are depicted as thick black lines, because their phase angles are independent. This is the case in radial networks, which have no loops, thus creating no algebraic constraints on the phase angles.

$$P_f = \begin{bmatrix} P_{f1} \\ P_{f2} \end{bmatrix}, \quad (24)$$

$$A = \begin{bmatrix} 1 & -1 \\ 0 & -1 \\ -1 & 0 \end{bmatrix}, \quad (25)$$

$$b = \begin{bmatrix} 0.5 \\ 0.5 \\ -1 \end{bmatrix}. \quad (26)$$

TABLE 2

P$_{f1}$ FOR A SIMPLE RADIAL NETWORK SYSTEM
Calculated Versus Expected Variable P$_{f1}$

| Case | P$_{f1\ init.}$ | P$_{f1\ fin.}$ | P$_{f1\ exp.}$ | Iter. |
|---|---|---|---|---|
| 1 | 0.9326 | 1.0028 | 1.0 | 4 |
| 2 | 0.5594 | 0.9998 | 1.0 | 6 |

TABLE 3

P$_{f2}$ FOR A SIMPLE RADIAL NETWORK SYSTEM
Calculated Versus Expected Variable P$_{f2}$

| Case | P$_{f2\ init.}$ | P$_{f2\ fin.}$ | P$_{f2\ exp.}$ |
|---|---|---|---|
| 1 | 1.1554 | 0.4971 | 0.5 |
| 2 | 0.8158 | 0.4971 | 0.5 |

Figure 6:
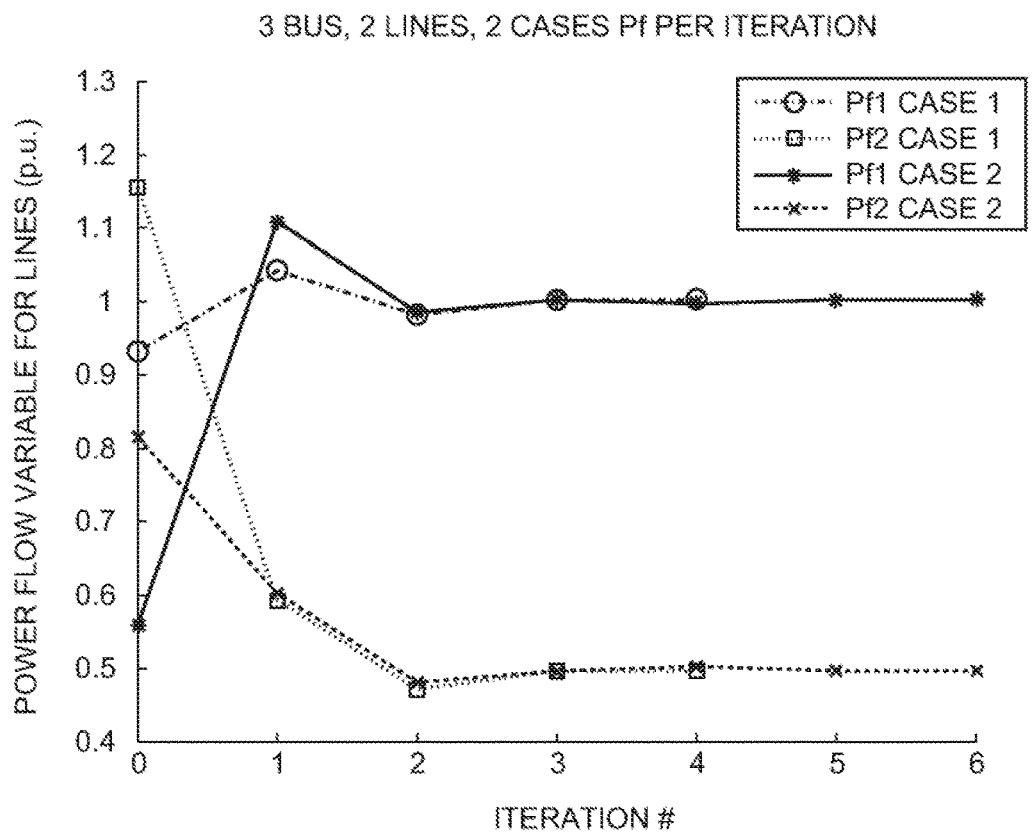
FIG. 6 is a graph of power flow (Pf) that satisfies Kirchhoff's current law (KCL) versus iterations for a simulation of the simple radial power network of FIG. 5 using distributed line flow computing according to the present disclosure.
Figure 7:
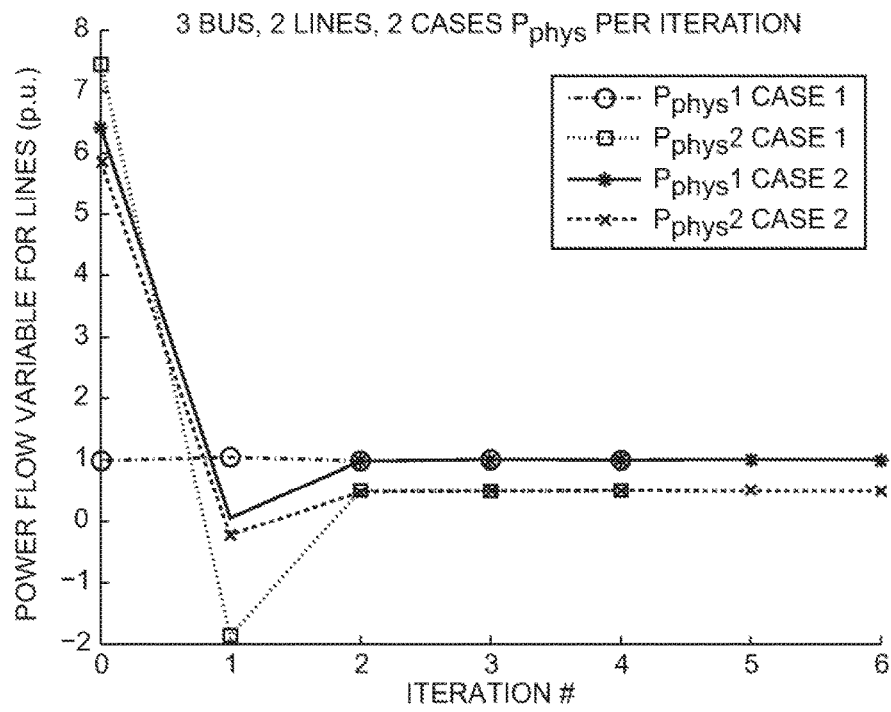
FIG. 7 is a graph of power flow (Pphys) that satisfies Kirchhoff's voltage law (KVL) and Ohm's law versus iterations for a simulation of the simple radial power network of FIG. 5 for two example cases using distributed line flow computing according to the present disclosure.

FIG. 6 is a graph of power flow (P$_f$) that satisfies KCL versus iterations for a simulation of the simple radial power network of FIG. 5 using distributed line flow computing according to the present disclosure. FIG. 7 is a graph of power flow (P$_{phys}$) that satisfies KVL and Ohm's law versus iterations for a simulation of the simple radial power network of FIG. 5 for two example cases using distributed line flow computing according to the present disclosure. The P$_{f1}$ and P$_{f2}$ both converge to be very close to the expected value, within 0.003 p.u. of the expected values. FIG. 6 and FIG. 7 show the convergence of P$_{f1}$ and P$_{f2}$, respectively, for both cases of initial conditions. The initial conditions take four to six iterations, as opposed to two iterations for the two bus system.

Figure 8:
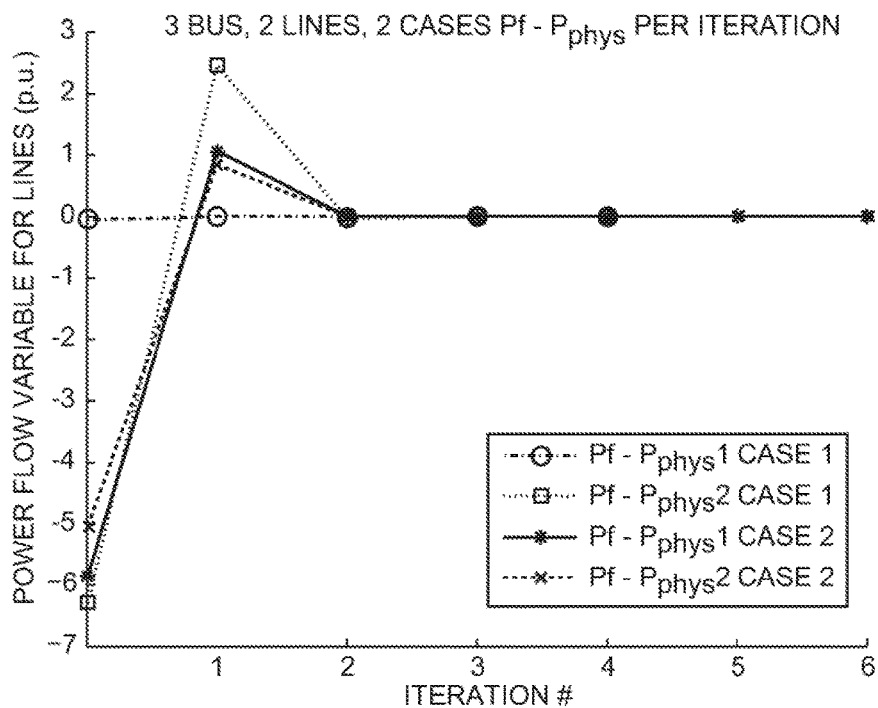
FIG. 8 is a graph of power flow (Pphys-Pf) versus iterations for a simulation of the simple radial power network of FIG. 5 for two example cases using distributed line flow computing according to the present disclosure.
Figure 9:
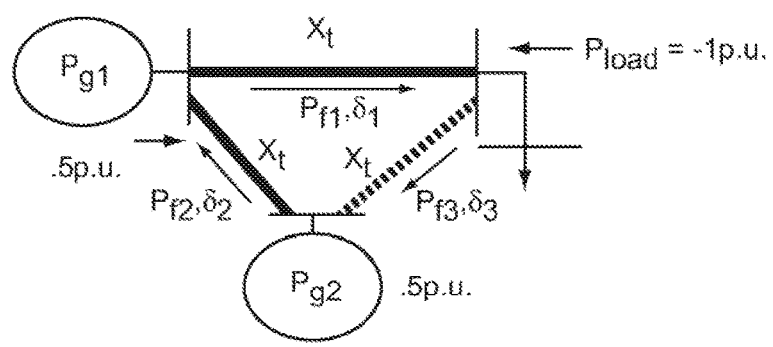
FIG. 9 is a single-line diagram depicting a simple mesh power network.

FIG. 8 is a graph of power flow (P$_{phys}$-P$_f$) versus iterations for a simulation of the simple radial power network of FIG. 5 for two example cases using distributed line flow computing according to the present disclosure. The graph of FIG. 8 shows that the variables P$_f$ and P$_{phys}$ eventually converge. A mesh network is a network which has loops created by the lines. Transmission networks are typically meshed and are harder to solve for than radial networks. The generators of the buses give the same injection values as the case of the simple radial network. However, this example contains an additional transmission line, which changes the A matrix. FIG. 9 is a single-line diagram depicting a simple mesh power network. In the simulations, the third transmission line, represented by dashed line, must have its phase angle updated according to KVL, which relates to the phase angles of the other two lines, represented by thick black lines. The KVL constraint is applied after the independent transmission lines have updated their own phase angle, but before the next iteration loop of P$_f$ in the network. The necessary variables are defined as follows:

$$P_f = \begin{bmatrix} P_{f1} \\ P_{f2} \\ P_{f3} \end{bmatrix}, \quad (27)$$

$$A = \begin{bmatrix} 1 & -1 & 0 \\ 0 & 1 & -1 \\ -1 & 0 & 1 \end{bmatrix}, \quad (28)$$

$$b = \begin{bmatrix} 0.5 \\ 0.5 \\ -1 \end{bmatrix}. \quad (29)$$

TABLE 4

P$_{f1}$ FOR A SIMPLE MESH NETWORK SYSTEM
Calculated Versus Expected Variable P$_{f1}$

| Case | P$_{f1\ init.}$ | P$_{f1\ fin.}$ | P$_{f1\ exp.}$ | Iter. |
|---|---|---|---|---|
| 1 | 1.261426 | 0.500000 | 0.5 | 5 |
| 2 | 1.192532 | 0.500018 | 0.5 | 6 |

TABLE 5

P$_{f2}$ FOR A SIMPLE MESH NETWORK SYSTEM
Calculated Versus Expected Variable P$_{f2}$

| Case | P$_{f2\ init.}$ | P$_{f2\ fin.}$ | P$_{f2\ exp.}$ |
|---|---|---|---|
| 1 | 1.131070 | -0.000000 | 0 |
| 2 | 1.056670 | 0.000481 | 0 |

TABLE 6

P$_{f3}$ FOR A SIMPLE MESH NETWORK SYSTEM
Calculated Versus Expected Variable P$_{f3}$

| Case | P$_{f3\ init.}$ | P$_{f3\ fin.}$ | P$_{f3\ exp.}$ |
|---|---|---|---|
| 1 | 0.589892 | -0.500000 | -0.5 |
| 2 | 0.896521 | -0.500499 | -0.5 |

Figure 10:
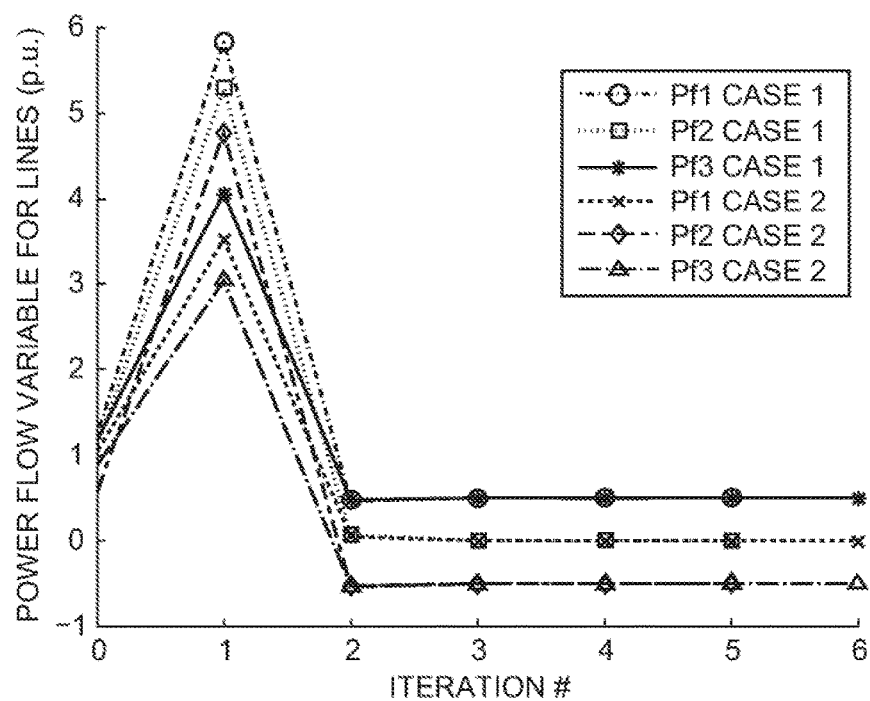
FIG. 10 is a graph of power flow (Pf) that satisfies Kirchhoff's current law (KCL) versus iterations for a simulation of the simple mesh power network of FIG. 9 using distributed line flow computing according to the present disclosure.
Figure 11:
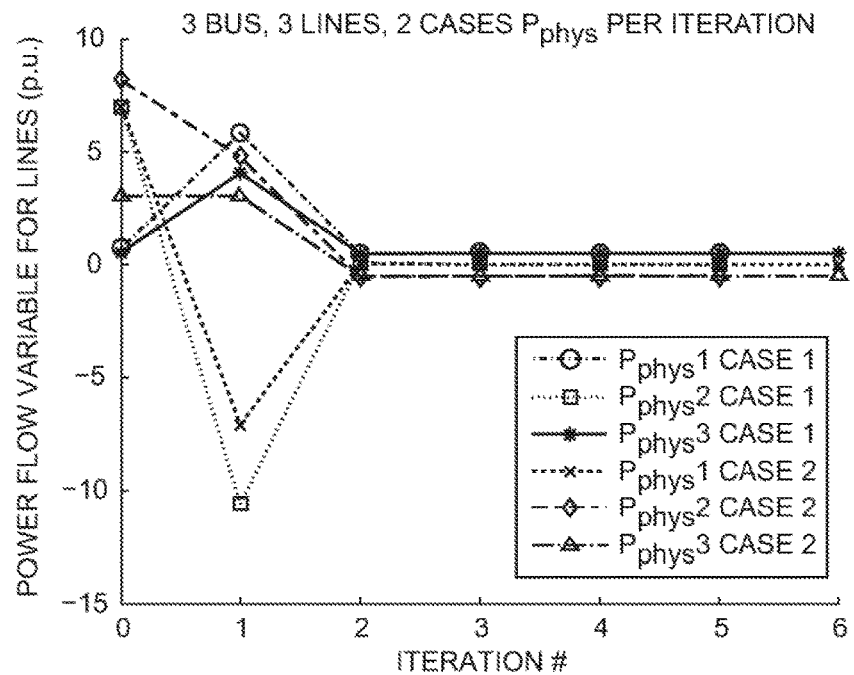
FIG. 11 is a graph of power flow (Pphys) that satisfies Kirchhoff's voltage law (KVL) and Ohm's law versus iterations for a simulation of the simple mesh power network of FIG. 9 for two example cases using distributed line flow computing according to the present disclosure.
Figure 12:
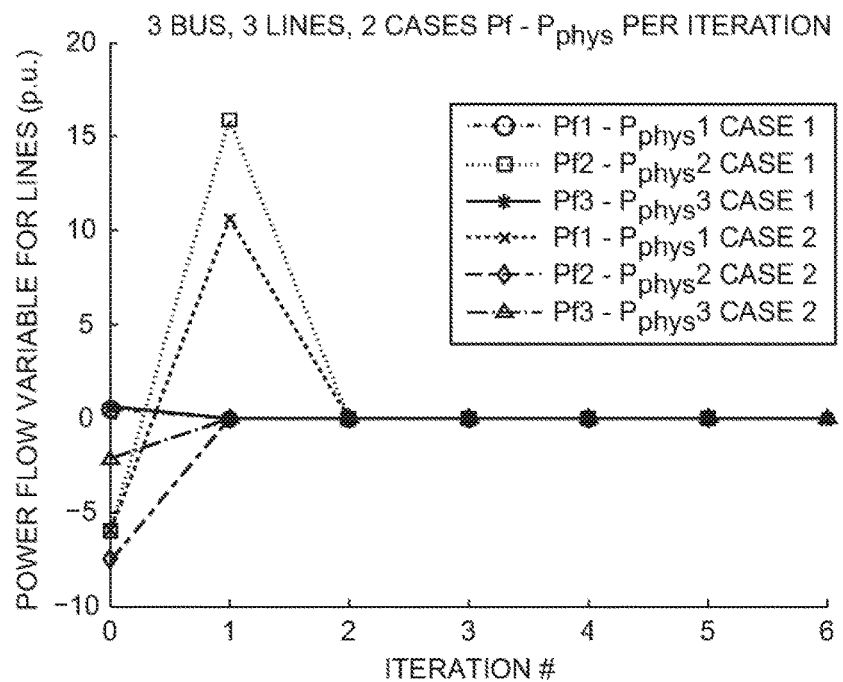
FIG. 12 is a graph of power flow (Pphys-Pf) versus iterations for a simulation of the simple mesh power network of FIG. 9 for two example cases using distributed line flow computing according to the present disclosure.

The iterations of two sets of initial conditions are plotted in FIGS. 10 to 12. There are three line flows, and they each converge to their own corresponding value. This case is interesting because one of the flows, P$_{f2}$, ends up being zero, because on either side of the line the flows being sent are equal to each other, and cancelling out. This can be verified by doing the example with only one generation and half the load at a time, and then applying superposition to both sub-examples. As in the simple radial network example, the algorithm usually converges in around six iterations. The deviation from the expected value is also within the 0.003 range. The simulation results of these three simple configurations show that this algorithm can be used to solve for DC power flow in systems such as these, with given bus injections and line reactances. In particular, FIG. 10 is a graph of power flow (P$_f$) that satisfies KCL versus iterations for a simulation of the simple mesh power network of FIG. 9 using distributed line flow computing according to the present disclosure.

FIG. 11 is a graph of power flow (P$_{phys}$) that satisfies KVL and Ohm's law versus iterations for a simulation of the simple mesh power network of FIG. 9. Two example cases using distributed line flow computing according to the present disclosure are provided.

FIG. 12 is a graph of power flow (P$_{phys}$-P$_f$) versus iterations for a simulation of the simple mesh power network of FIG. 9. Two example cases using distributed line flow computing according to the present disclosure provided.

Figure 13:
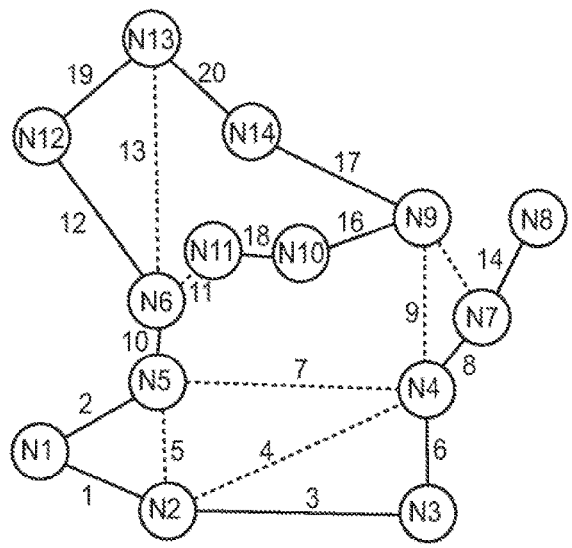
FIG. 13 is a line diagram of an Institute of Electrical and Electronics Engineers (IEEE) fourteen bus system that can be monitored via the distributed line flow computing methods, systems, and/or software of the present disclosure.

In order to show feasibility of the proposed method in a larger system, consider an IEEE fourteen bus test system. FIG. 13 is a representation of the system with lines as branches 1 through 20 and buses as nodes N1 through N14 of a graph. In particular, FIG. 13 is a line diagram of an Institute of Electrical and Electronics Engineers (IEEE) fourteen bus system that can be monitored via distributed line flow computing methods, systems, and/or software of the present disclosure. A normal tree is represented by solid black lines, wherein the solid black lines further represent 8 values, which would be updated independently in the algorithm, according to equation (22). The direction of the line flow is taken to always flow towards the bus with a higher index number, which in this case is also an element number of a node. The A matrix can be created by using the bus and branch data of the system, and the injections, b, are given as the generation or load values in the data. In the interest of space, the actual matrix A and vector b are not shown.

The simulation lasted 23 iterations, in the system which had 14 buses and 20 branches. Out of the 20 branches, 13 branches have independent phase angle difference values, and were chosen based on the normal tree shown in FIG. 13. The last 7 branches, indicated in dashed lines, have their phase angles updated according to KVL. For example, $\delta_5$ would be constrained by $\delta_5-\delta_2+\delta_1=0$.

Figure 14:
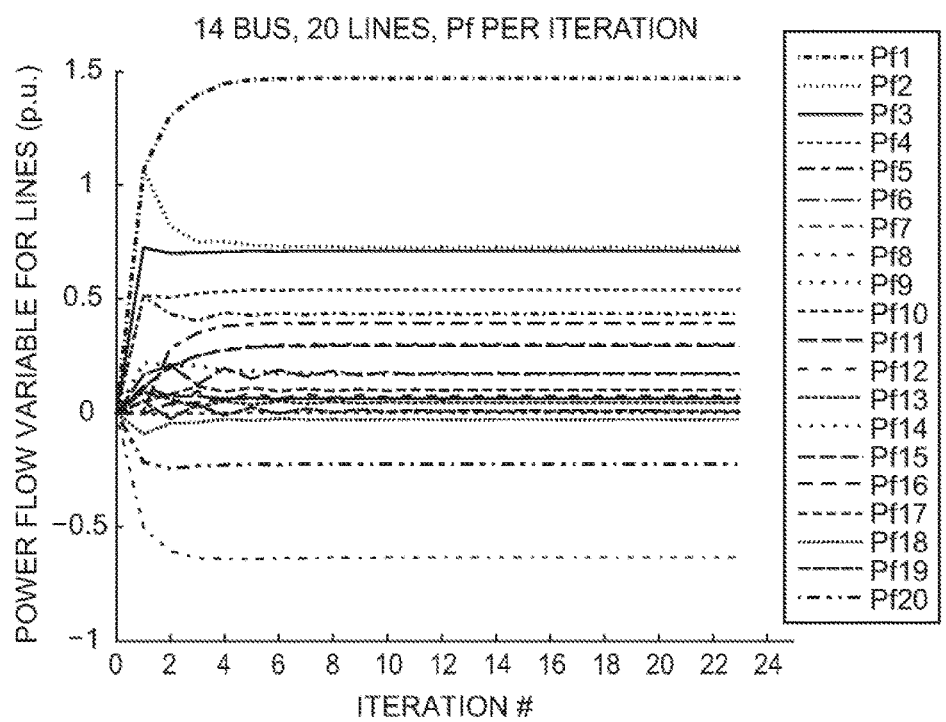
FIG. 14 a graph of power flow (Pf) that satisfies Kirchhoff's current law (KCL) versus iterations for a simulation of the IEEE fourteen bus system of FIG. 13 using distributed line flow computing according to the present disclosure.
Figure 15:
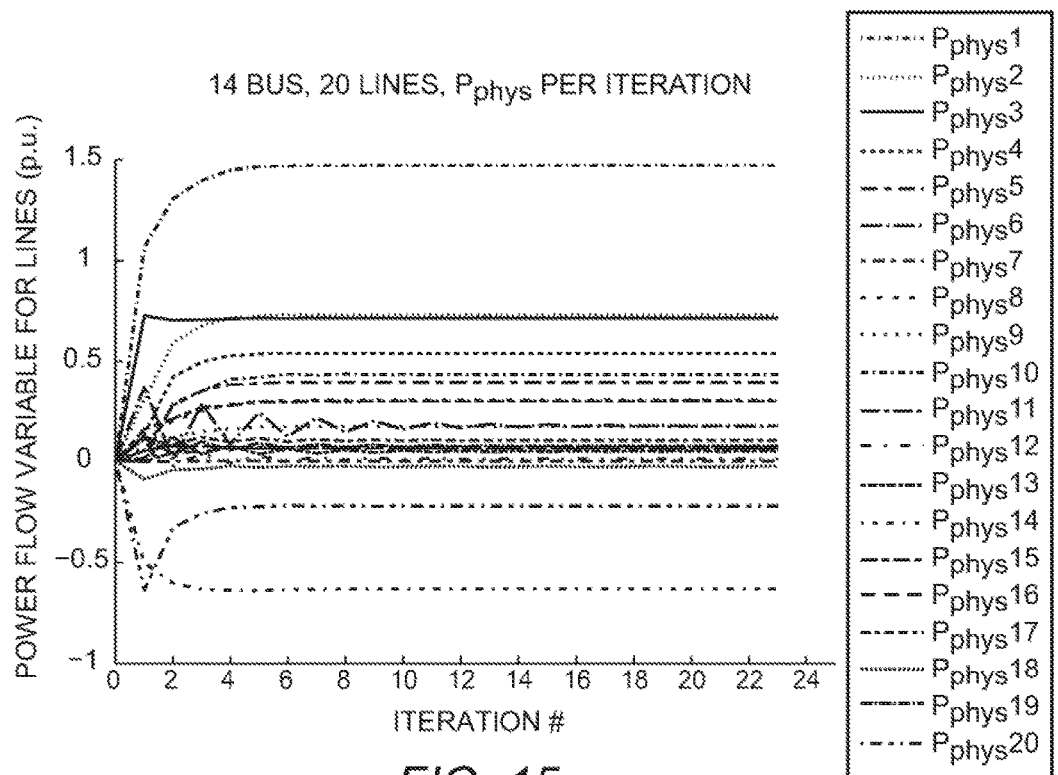
FIG. 15 is a graph of power flow (Pphys) that satisfies Kirchhoff's voltage law (KVL) and Ohm's law versus iterations for a simulation of the IEEE fourteen bus system of FIG. 13 for two example cases using distributed line flow computing according to the present disclosure.

The iterations of $P_f$ and $P_{phys}$ are shown in FIGS. 14 and 15. They are shown to settle to some value, which is the final answer when the algorithm converges. The difference between $P_f$ and $P_{phys}$ in FIG. 16 is shown to go to zero, which is the desired result, shows that the algorithm has converged.

FIG. 14 a graph of power flow ($P_f$) that satisfies KCL versus iterations for a simulation of the IEEE fourteen bus system of FIG. 13 using distributed line flow computing according to the present disclosure.

FIG. 15 is a graph of power flow ($P_{phys}$) that satisfies KVL and Ohm's law versus iterations for a simulation of the IEEE fourteen bus system of FIG. 13 for two example cases using distributed line flow computing according to the present disclosure.

Figure 16:
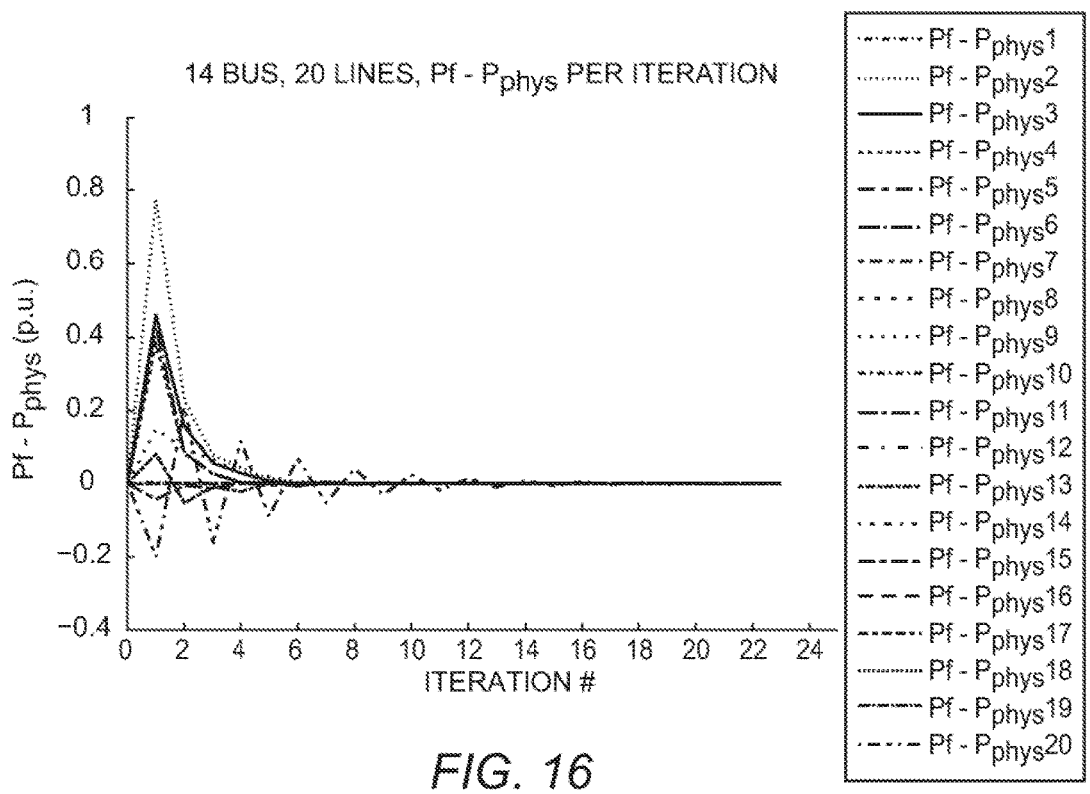
FIG. 16 is a graph of power flow (Pphys-Pf) versus iterations for a simulation of the IEEE fourteen bus system of FIG. 13 for two example cases using distributed line flow computing according to the present disclosure.

FIG. 16 is a graph of power flow ($P_{phys}-P_f$) versus iterations for a simulation of the IEEE fourteen bus system of FIG. 13 for two example cases using distributed line flow computing according to the present disclosure. The solution was checked with a simultaneous equation solver, which represents the centralized solution of the power flow. The results are shown in Table VII. The difference between the two solutions is around 0.02 p.u. for the power flows within each of the lines.

TABLE 7

$P_f$ SOLUTIONS OF THE IEEE FOURTEEN BUS SYSTEM
Centralized Versus Distributed Solution

| Line No. | $P_{fCentr.}$ | $P_{fDistr.}$ |
|---|---|---|
| 1 | 1.4889 | 1.4705 |
| 2 | 0.7408 | 0.7285 |
| 3 | 0.7246 | 0.7115 |
| 4 | 0.5467 | 0.5395 |
| 5 | 0.4047 | 0.3957 |
| 6 | −0.2285 | −0.2217 |
| 7 | −0.6260 | −0.6331 |
| 8 | 0.2907 | 0.3031 |
| 9 | 0.1666 | 0.1727 |
| 10 | 0.4196 | 0.4349 |
| 11 | 0.0634 | 0.0650 |
| 12 | 0.0732 | 0.0752 |
| 13 | 0.1728 | 0.1752 |
| 14 | 0.0000 | 0.0014 |
| 15 | 0.2907 | 0.2975 |
| 16 | 0.0619 | 0.0658 |
| 17 | 0.1014 | 0.1028 |
| 18 | −0.0281 | −0.0272 |
| 19 | 0.0119 | 0.0116 |
| 20 | 0.0487 | 0.0482 |

The results show in Table 7 show that the method of the present disclosure yields accurate power flow calculations for a nontrivial system. The meshed nature of the IEEE fourteen bus system of FIG. 13 is also accounted for, by creating algebraic constraints for the phase angle variables of the system. The number of iterations used to solve the IEEE fourteen bus system is around five times greater than the number of iterations required for the three bus system of FIG. 9.

Figure 17:
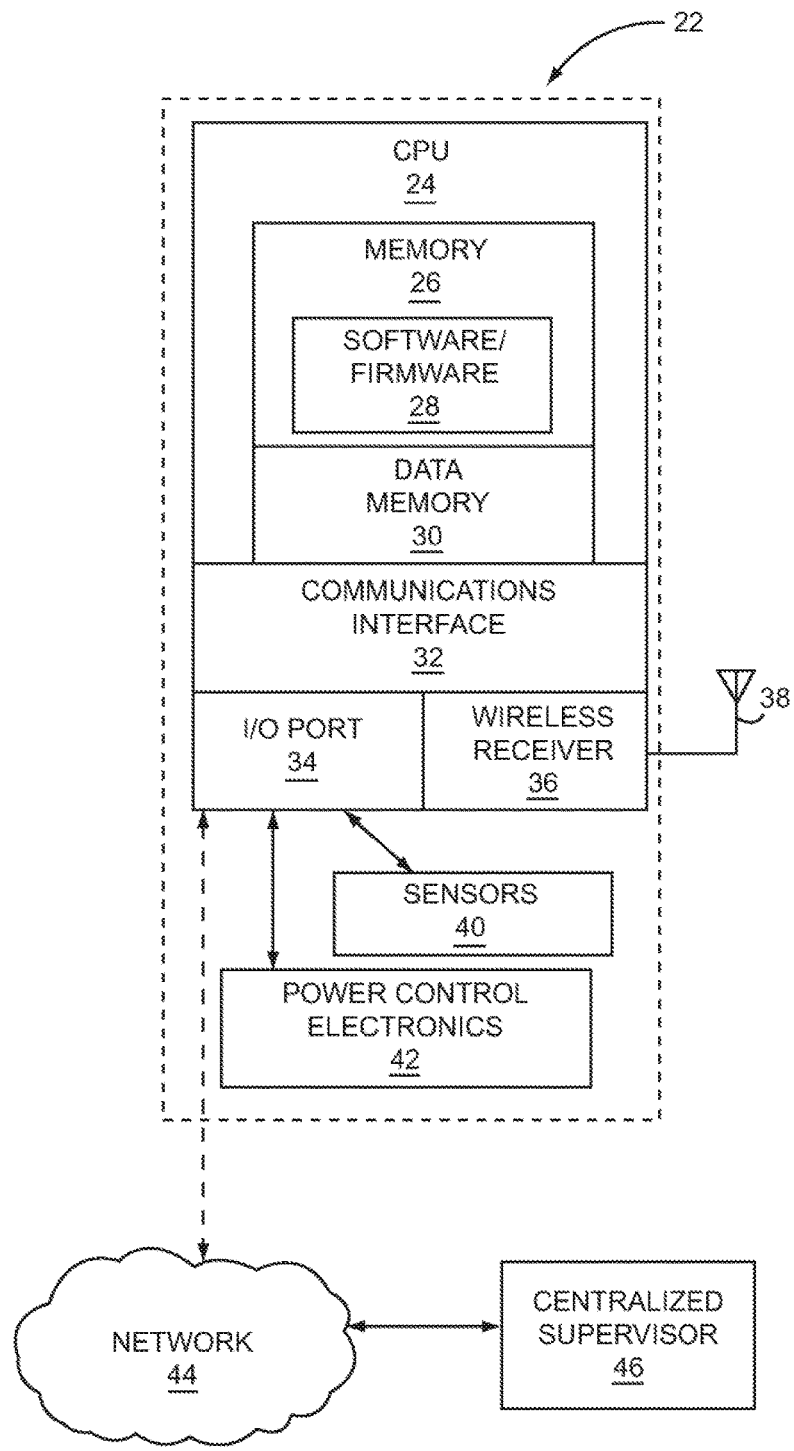
FIG. 17 is a block diagram of a line flow calculator device for executing the distributed line flow computing method in accordance with the present disclosure.

FIG. 17 is a block diagram of a line flow calculator 22 (which may form a portion of or the entirety of a line flow control system) for executing the distributed line flow computing method in accordance with the present disclosure. The line flow calculator 22 includes a central processing unit (CPU) 24 for executing software and/or firmware 28 stored in a memory 26 wherein the software and/or firmware has a code that is executable by the CPU 24 to realize the distributed line flow computing method of the present disclosure. The line flow calculator 22 also includes a data memory 30 that serves as a buffer for a communications interface 32 that passes data to and from the data memory 30. The communications interface 32 controls an input/output (I/O) port 34 and a wireless transceiver 36 and an antenna 38 that is usable to transmit data to and receive data from other line flow calculators such as the line low calculator 22. The I/O port 34 may be coupled to sensors 40 and power control electronics 42. Either the I/O port 34 or the wireless transceiver 36 is adaptable to interface with a computer network 44 that provides communication with a centralized supervisor 46.

The line flow calculator 22 may be integrated with the sensors 40 and integrated into a dynamic line rating (DLR) device that uses the sensors 40 to determine the maximum current carrying capacity of a transmission line for an electrical utility. In particular, the sensors 40 are adapted to monitor ambient weather conditions such as temperature, wind speed, and wind direction along with solar radiation local to the transmission line. The sensors 40 may also include strain-gauge tension sensors that are usable to monitor transmission line sag to insure that the transmission line to ground clearance thresholds are not violated.

The line flow calculator 22 may be further integrated with the power control electronics 42 to comprise a flexible AC transmission system (FACTS) device that improves power transmission efficiency. The line flow calculators 22 are adaptable to provide data to the FACTS devices that is usable by the FACTS devices to control power injections into the nodes of a network in order to increase the efficiency of power transmission. However, it is to be understood that the line flow calculator 22 is operable as a separate device that communicates with external DLRs and FACTS. Moreover, while the line flow calculator 22 are adaptable to optionally communicate over the computer network 44 with the centralized supervisor 46, the line flow calculator 22 operates locally to calculate line flows without needing to communicate with the centralized supervisor 46. A primary use of the optional communication between the line flow calculator 22 and the centralized supervisor 46 is to automatically report line flow calculations that fall outside predetermined limits.

Figure 18:
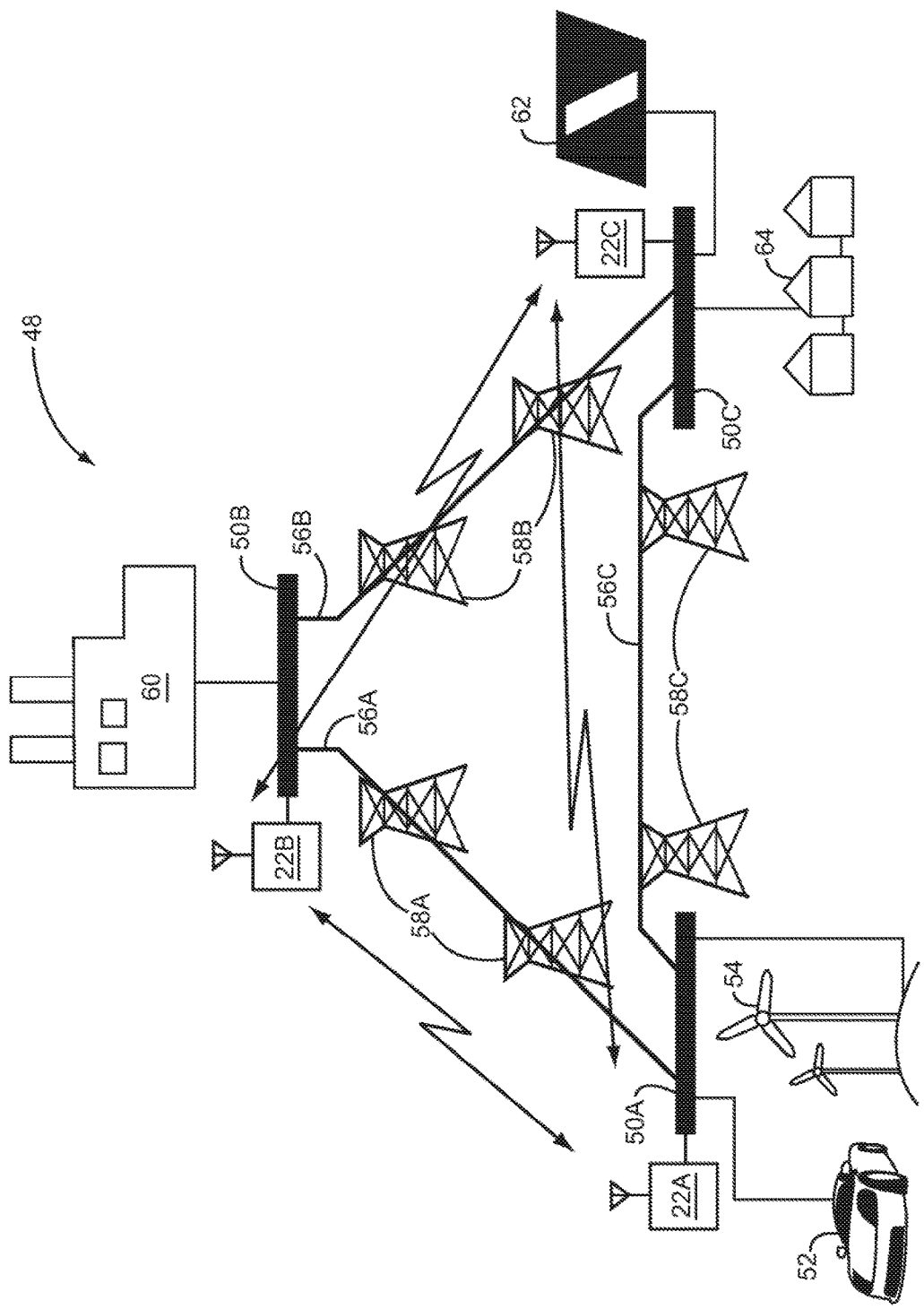
FIG. 18 is a simplified diagram of an electrical utility network that incorporates line flow calculators that are usable to implement distributed line flow computing methods, systems, and/or software of the present disclosure.

FIG. 18 is a simplified diagram of an electrical utility network 48 that incorporates line flow calculators 22A, 22B, and 22C that are usable to implement distributed line flow computing methods, systems, and/or software of the present disclosure. The electrical utility network 48 includes nodes 50A, 50B, and 50C. A plug-in hybrid electric vehicle (PHEV) 52 and a wind farm electrical generator 54 are coupled to the node 50A. The line flow calculator 22A accounts for the presence of the PHEV 52 and the wind farm electrical generator 54 using physical data that represents the operating characteristics of the PHEV 52 and the wind farm electrical generator 54. The physical data can be, but is not limited, to resistance, inductance, and capacitance. The data can also be dynamic measurements of reactive power and real power that are stored, delivered by the wind farm electrical generator 54 and absorbed and stored by the PHEV 52. The line flow calculator 22A shares the physical data from the node 50A with the line flow calculators 22B, and 22C.

A traditional electric power plant 60 is coupled to the node 50B. Physical data associated with the traditional electric power plant 60 is used by the line flow calculator 22B coupled to the node 50B to at least partially calculate the line flow for a transmission line 56A that is held above ground by transmission line towers 58A. The line flow calculator 22B communicates with the line flow calculator 22A to distribute data and portions of the line flow calculation for the transmission line 56A.

A transmission line 56B couples the node 50B to the node 50C and is held above ground by transmission line towers 58B. A photovoltaic array 62 of utility scale is coupled to the node 50C along with commercial and residential loads 64. The line flow calculator 22B communicates with the line flow calculator 22C to share data associated with the tradition electrical power plant 60, the photovoltaic array 62, and the commercial and residential loads 64 as well as distribute partial calculations to calculate a line flow for the transmission line 56B.

Similarly, a transmission line 56C couples the node 50A to the node 50C and is held above the ground by transmission line towers 58C. The line flow calculator 22C communicates with the line flow calculator 22A to share data associated with the photovoltaic array 62, and the commercial and residential loads 64, the PHEV 52, and the wind farm electrical generator 54 as well as distribute partial calculations to calculate a line flow for the transmission line 56B. In at least one embodiment, the distributed partial calculations can be in the form of a distributed Hessian matrix such as the Hessian matrix, $J_k$. The distributed partial calculations are preferably communicated via the wireless transceiver 36 (FIG. 17) of the line flow calculators 22A, 22B, and 22C.

Line flow calculators 22 may be further integrated with and/or put in communication with power control electronics 42 to dynamically adjust the reactances of transmission lines. Line flow calculators could, for example, be integrated with or put in communication with a distributed FACTS (or D-FACTS), which is a low cost FACTS device that can adjust the reactance of a transmission line. D-FACTS devices are part of smart grid systems, such as DSRs by Smart Wire Grid. Adjusting the reactances of transmission lines changes the power flow and maximum possible power flow through the line. It is noted that although power control electronics 42, which may comprise D-FACTS, are illustrated in FIG. 17 as part of line flow calculator 22, such devices may be implemented separately from line flow calculators and controlled remotely by line flow calculators or other devices.

Figure 19:
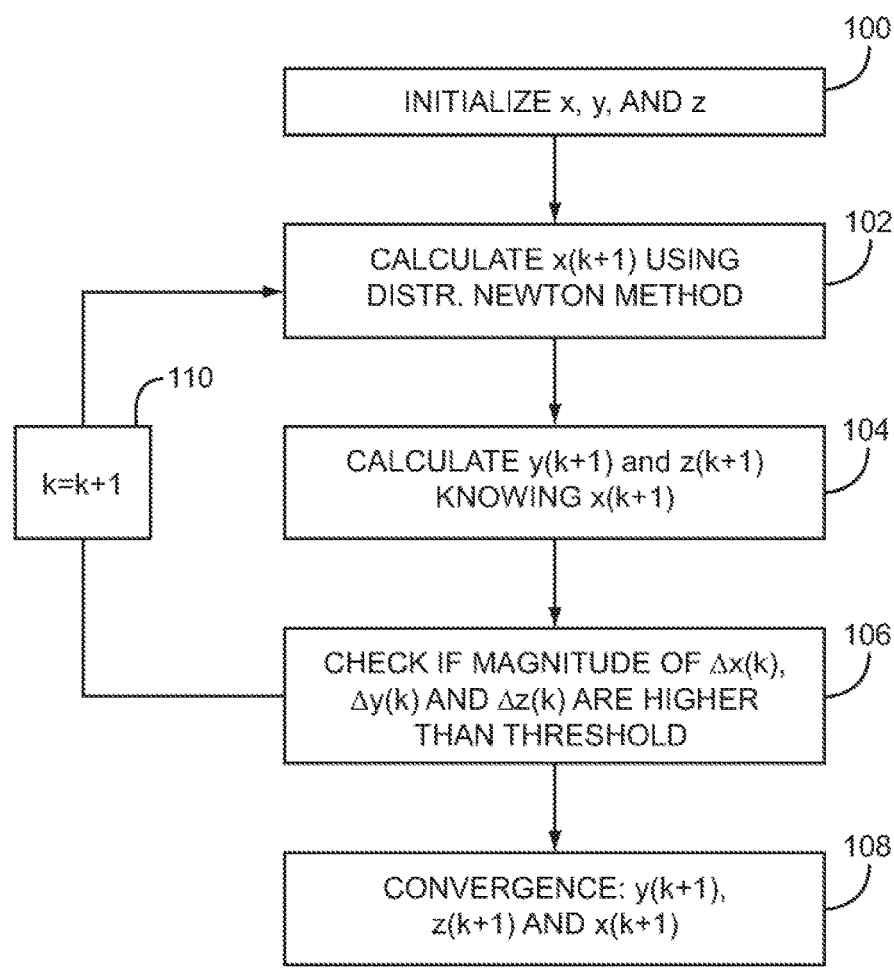
FIG. 19 is a flow chart illustrating the general operation of the distributed line flow computing method of the present disclosure.

FIG. 19 is a flow chart illustrating the general operation of the distributed line flow computing method of the present disclosure. In this case, a variable x represents branch line flows of an objective function to be optimized, a variable y represents nodal outputs quantities, and the variable z represents quantities relevant to components coupled to the nodes. A variable k represents an iterator used to iterate through matrices that include the variables x, y, and z. The objective function can be written as a summation of sub-functions, each of which can be written as a function of only one variable.

The flow computing method receives the objective function and initializes the variables x, y, and z (step 100). The variable x is updated via the objective function and the initialized variables x, y, and z using the distributed Newton method (step 102). In an electrical energy system, such as the electrical utility network 48 (FIG. 18) the step 102 uses KCL to account for physical constraints.

Values for the nodal output variables y and the component variables z are calculated using values calculated for the updated variable x (step 104). In an electrical energy system, such as the electrical utility network 48 (FIG. 18), the step 104 uses KVL and Ohm's law to account for physical constraints.

The magnitudes of the component variables z, the nodal output variables y, and the branch flow variables x are checked for convergence within a predetermined threshold range (step 106). If convergence within a predetermined range occurs, the flow computing method is complete (step 108). Alternately, if the convergence falls outside the predetermined range, the integrator k is incremented (step 110). The step 102, step 104, and step 110 are repeated until convergence of the magnitudes of the component variables z, the nodal output variables y, and the branch flow variables x falls within a predetermined range.

Attempting to exceed the maximum transfer limit of transmission lines is dangerous because the power flow solution is infeasible, which means that there is no combination of voltages which can fulfill the power generation and consumption, given the network configuration. Thermal line limits from DLR devices may also be considered as limits when adjusting D-FACTS.

The system operator's calculation of power flow will fail if the system is infeasible. In a radial network, which does not have loops, it can be easy to determine maximum transfer limit problems by inspection. However, in a meshed network, it is not typically clear where adjustments should be made.

The line flow calculator of the present disclosure can be used for identifying where power flows can exceed the maximum transfer limit in each line such that adjustments can be made in conjunction with D-FACTS/DSRs to compensate in order to reach a feasible solution.

As an illustration of the use of such dynamic adjustments, consider the simple 3 bus example shown schematically in FIG. 20A, an example 3 bus system in a balanced, feasible scenario. The network depicted in this figure has two generators, which generate 1 p.u. of energy each, and one load, which consumes 2 p.u. Assuming that resistive losses are negligible, it is expected that 1 p.u. of power is transmitted from bus 1 to bus 3 and another 1 p.u. of power is transmitted from bus 2 to bus 3. Power flow calculations confirm that this is indeed the case. This system has a feasible power flow solution.

Consider another case, where the same generation and load is applied, but the reactances are all 1.3, as shown in FIG. 20B. This network does not have a feasible power flow solution. The maximum real power transfer limit of the transmission line is approximately the reciprocal of the reactance in per unit, so each line can only carry 0.769 p.u. of power to the load. The distributed algorithm of the present disclosure, which is allowed to adjust the reactance while calculating the power flows, results in a network with new reactances and has a feasible power flow solution. As depicted in FIG. 20C, the reactances for line 2 and 3 have to be reduced to allow 1 p.u. of power to be transferred in each line to bus 3.

It is noted that this algorithm tends to be conservative and may adjust the reactance more than the minimum amount necessary to achieve a feasible system. The adjusted reactances in this example resulted in 0.9 p.u. instead of 1 p.u. because the adjustment was made with an extra ten percent margin to insure a feasible solution was found.

Additionally or alternatively, the method can be used to determine how to adjust power injections at nodes to insure feasible power delivery. In practice, this would be equivalent to partial load shedding and corresponding generation adjustment. The change in injections can be calculated as:

$$\Delta b = \frac{1}{2} A A^T v. \tag{30}$$

Consider a case, depicted in FIG. 20D, where the generator cannot supply 2 p.u. of power from the generator to the load, because the transmission line reactances are too high. This system also has no power flow solution. However, by reducing the load and generation to 0.176, a feasible power flow solution can be found. This new feasible network is depicted in FIG. 20E. Loads can be reduced, for example, by transmitting signals requiring power reduction to smart devices, smart appliances, and/or smart systems, such as air conditioners and electric vehicles among may other devices, appliances, and systems, with communications enabling them to be controlled by a system operator or grid component, such as power control electronics 42, or by transmitting signals or other information (e.g., via e-mail or short message service (SMS) text message) to users drawing power from a grid, or otherwise utilizing a grid or similar network, requesting that they reduce their power usage. As those skilled in the art will readily appreciate, each smart device, appliance, or system may include a communications system that allows that device, appliance, or system to communicate with one or more load calculators and/or centralized supervisor system for any suitable purpose, such as negotiating a change in electrical load.

It is noted that this algorithm focuses on ensuring a network's power flow configuration is feasible, and not necessarily optimal, even though optimization methods are used to calculate the numerical result. The numerical results of the optimization method results in Lagrange multiplier values, which must be zero for the power flow to be feasible.

Figure 21:
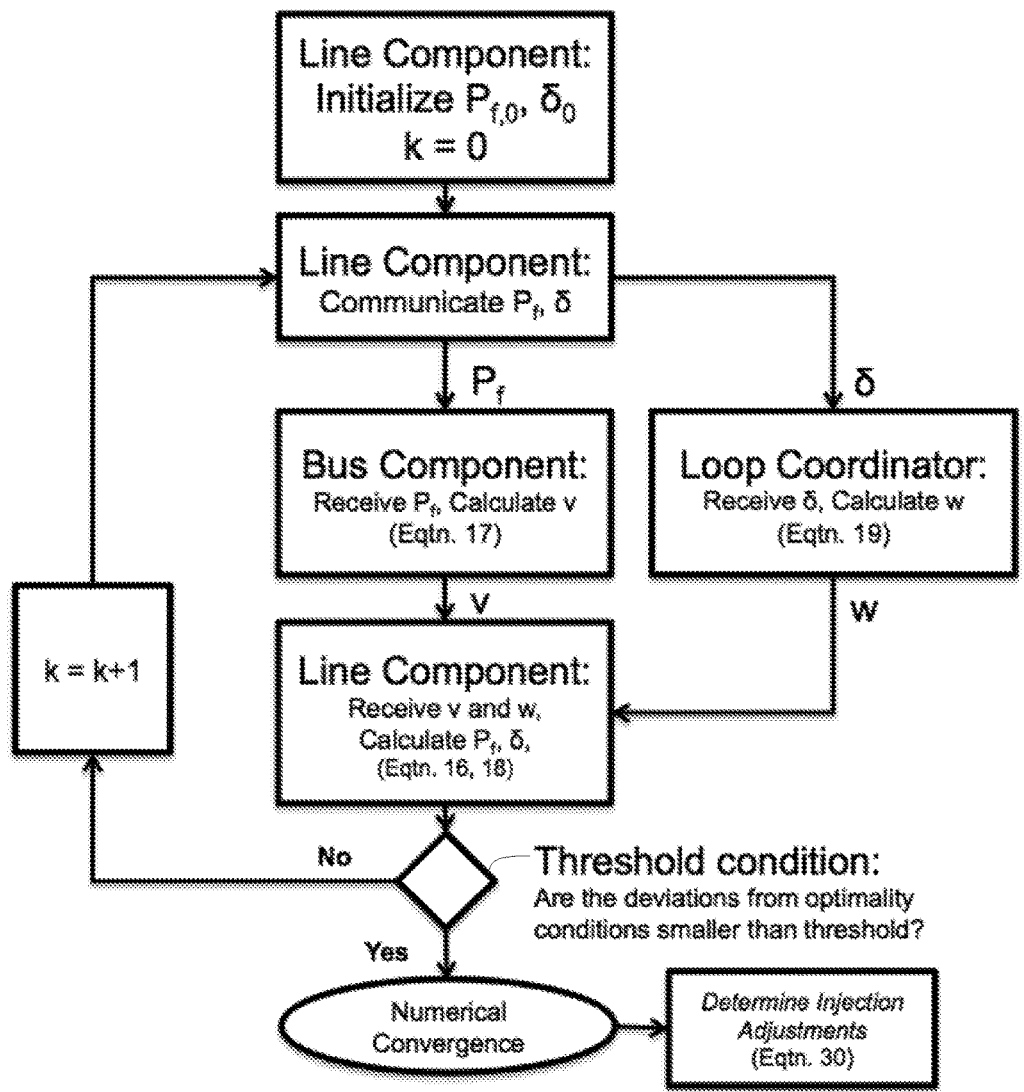
FIG. 21 is a flow chart illustrating a method of implementing calculation, communication, and feasibility adjustments steps according to aspects of the present disclosure.

FIG. 21 illustrates a flow chart of the method's calculation and communication steps with the feasibility adjustments included. By utilizing such a method, each transmission line can examine its own maximum power delivery condition each iteration, and after algorithm convergence, the Lagrange multiplier corresponding to nodal power balance, v, can be used to determine whether injection adjustments and/or line reactance modifications are necessary.

It is to be understood that the flow computing method of the present disclosure updates variables x, y, and z is calculated for different locations with the electrical energy system, such as the electrical utility network 48 (FIG. 18). Moreover, the calculations are typically performed at different times. In this way, calculations for the variables x, y, and z are distributed throughout the electrical energy system such as the electrical utility network 48 (FIG. 18). Moreover, the flow computing method can be used to calculate the branch flow variables x for mini electrical grids such as those proposed for shopping centers and the like. Further still, it is to be understood that the flow computing method of the present disclosure is applicable to networks other than the electrical energy systems. Such networks include, but are not limited to, transportation networks, hydrological networks, and communications networks.

In accordance with the present disclosure, at least one embodiment of the above described method comprises computer instructions stored on a computer readable medium. Examples of computer readable mediums include but are not limited to, a random access memory (RAM), a read-only memory (ROM), a magnetic disk, a flash memory stick, a flash memory card, a digital versatile disk (DVD), and compact disk read-only memory (CDROM).

To illustrate the potential of this distributed power flow calculator for online contingency screening, consider again the simple three bus mesh network, shown in FIG. 9. Moreover, it is assumed that this network is in normal condition when all three lines are connected in the system. The results of the online calculation of the network condition are shown in Table 4, Table 5, and Table 6. Consider next, that line three is disconnected due to some fault. The embedded intelligence will then see this network as a simple three bus radial network, shown in FIG. 9. The algorithm will in this case, show results similar to the results in Table 4, Table 5, and Table 6. Using data transmitted from adjacent line flow calculators, the components of the network will recognize topology changes and the results of the algorithm will account for these changes. This procedure sets the basis for a distributed and automated contingency screening by the line flow calculators themselves. They could compare the computed flows to their thermal limits and send alerts to the centralized supervisor 46 (FIG. 17) as the flows are about to exceed these limits. Notably, these alerts can be created in a complete distributed way by lines interacting with neighboring nodes and lines.

The methods, systems, and software of the present disclosure specifically solves the lossless decoupled real power flow problem in a distributed way with respect to transmission lines and with communications between lines and buses. An extension to the disclosed methods, systems, and software is adaptable to a fully coupled, lossy, AC power flow.

Aspects of the present disclosure enable the formulation of optimization problems instead of or in addition to typical power flow problems. This can involve optimizing the settings of controllers in a network, optionally in substantially real time; for example, FACTS devices may be utilized for adjusting line flows and/or DLR units may be utilized to assess and/or operate within a line's thermal limits. The disclosed methods, systems, and software may also be applied to decoupled real power and/or AC coupled power flow.

In a broader sense, the disclosed methods, systems, and software provide a qualitatively different approach to computing power line flows by embedding line flow calculators which communicate with neighboring line flow calculators associated with adjacent lines and nodes. Moreover, the disclosed methods, systems, and software are adaptable to enhance modern centralized contingency screening and power flow computations. Further still, the disclosed methods, systems, and software are adaptable to provide a major fail-safe mechanism based on distributed local computations and communications for cases in which coordinated computing and communications fail to function.

Yet another use of the embodiments of this disclosure is that it provides a novel solution to an old problem of power flow calculations in large electric grids. Instead of relying on centralized information and calculations in utility control centers, the disclosed method enables parallel distributed computing by a distributed line flow calculator of each branch. Only information exchange with the nodes and branches directly to the line flow calculator is needed. As such, the method of the disclosure allows for the enabling of distributed micro-grids with embedded line flow calculators in their branches, which exchange information and autonomously compute their own equilibrium. Thus, the implications of the present disclosure on wide-spread distributed management of future electric power grids are far reaching. Moreover, the disclosure also supports parallel distributed computing of equilibria in any electrical network by incorporating line flow calculators embedded into the electrical network's branches while relying only on local information exchange between the line flow calculators.

The logic for distributed calculation using local, line based devices can also be extended to line based devices that allow for actuation or adjustment. One such example of such a device is the D-FACTS, which is a much less expensive FACTS device that can adjust the reactance of a transmission line. Adjusting the reactances of transmission lines changes the power flow and maximum possible power flow through the line.

Aspects of the present disclosure can be used to implement feasible autonomous electric energy systems, such as terrestrial power grids (local distribution utility grids and/or micro-grids, in particular), power systems for deep exploration in space, and shipboard power systems. Instead of requiring a single control center that collects measurements from often distant locations within a large system, aspects of the present disclosure make it possible to embed calculations by distributed physical components or groups of components (wires, power plants, electricity users) and support health monitoring of the interconnected large system by communicating with nearby equipment. Such features can be essential, for example, during emergency conditions in local distribution grids during bad weather and other unplanned events. Such features can also be critical for implementing manned or unmanned power systems for deep space exploration. The technology disclosed herein can also be useful for guaranteeing reliable operation of naval electric power grids during unplanned conditions.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 22:
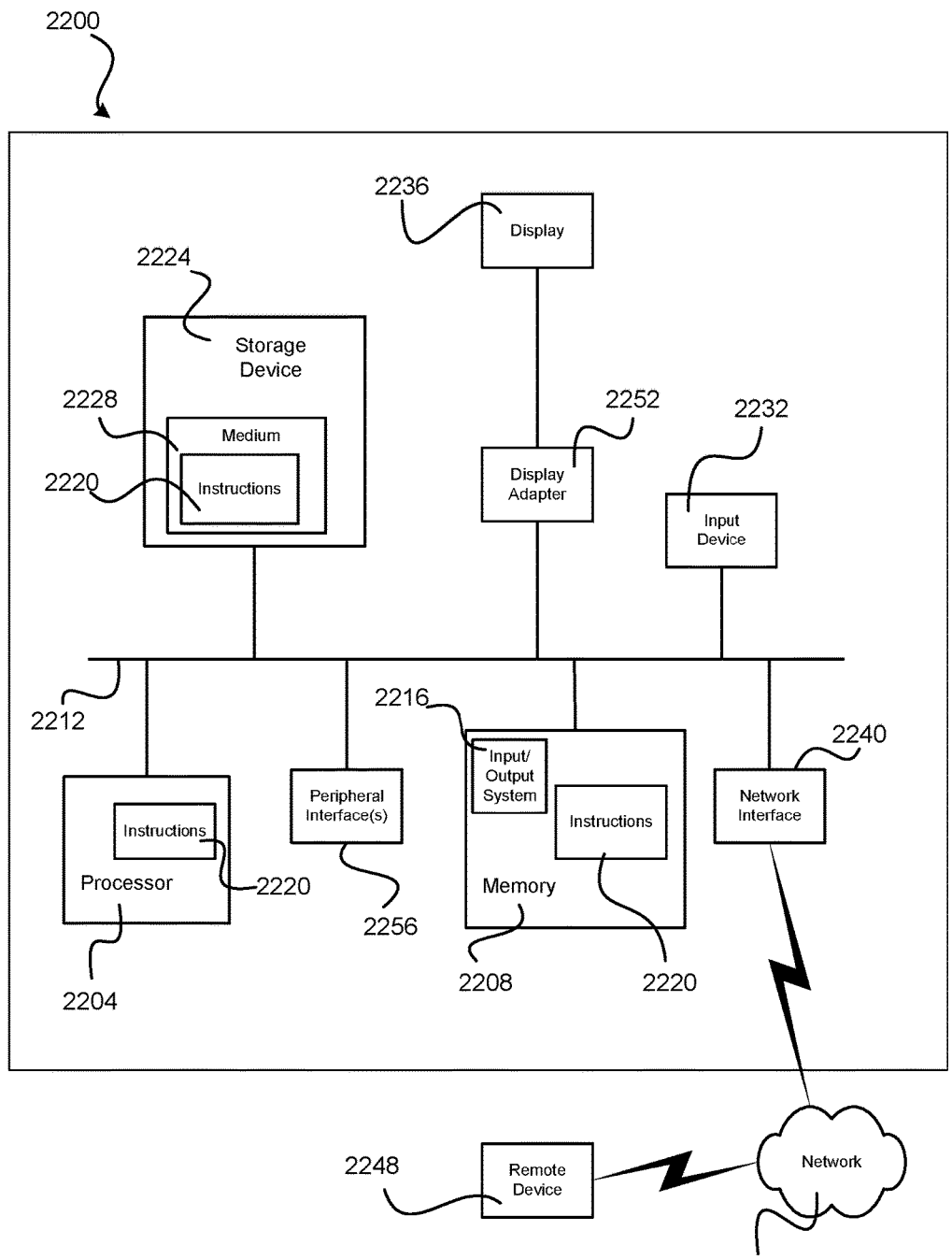
FIG. 22 is a block diagram of a computing system that can be used to implement any one or more of the methodologies disclosed herein and any one or more portions thereof.

FIG. 22 shows a diagrammatic representation of one embodiment of a computing device in the exemplary form of a computer system 2200 within which a set of instructions for causing a control system, such as one or more of the systems of FIGS. 17-18, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 2200 includes a processor 2204 and a memory 2208 that communicate with each other, and with other components, via a bus 2212. Bus 2212 may include any of several types of bus structures including, but not limited to, a memory bus, a memory controller, a peripheral bus, a local bus, and any combinations thereof, using any of a variety of bus architectures.

Memory 2208 may include various components (e.g., machine readable media) including, but not limited to, a random access memory component, a read only component, and any combinations thereof. In one example, a basic input/output system 2216 (BIOS), including basic routines that help to transfer information between elements within computer system 2200, such as during start-up, may be stored in memory 2208. Memory 2208 may also include (e.g., stored on one or more machine-readable media) instructions (e.g., software) 2220 embodying any one or more of the aspects and/or methodologies of the present disclosure. In another example, memory 2208 may further include any number of program modules including, but not limited to, an operating system, one or more application programs, other program modules, program data, and any combinations thereof.

Computer system 2200 may also include a storage device 2224. Examples of a storage device (e.g., storage device 2224) include, but are not limited to, a hard disk drive, a magnetic disk drive, an optical disc drive in combination with an optical medium, a solid-state memory device, and any combinations thereof. Storage device 2224 may be connected to bus 2212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2224 (or one or more components thereof) may be removably interfaced with computer system 2200 (e.g., via an external port connector (not shown)). Particularly, storage device 2224 and an associated machine-readable medium 2228 may provide nonvolatile and/or volatile storage of machine-readable instructions, data structures, program modules, and/or other data for computer system 2200. In one example, software 2220 may reside, completely or partially, within machine-readable medium 2228. In another example, software 2220 may reside, completely or partially, within processor 2204.

Computer system 2200 may also include an input device 2232. In one example, a user of computer system 2200 may enter commands and/or other information into computer system 2200 via input device 2232. Examples of an input device 2232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2232 may be interfaced to bus 2212 via any of a variety of interfaces (not shown) including, but not limited to, a serial interface, a parallel interface, a game port, a USB interface, a FIREWIRE interface, a direct interface to bus 2212, and any combinations thereof. Input device 2232 may include a touch screen interface that may be a part of or separate from display 2236, discussed further below. Input device 2232 may be utilized as a user selection device for selecting one or more graphical representations in a graphical interface as described above.

A user may also input commands and/or other information to computer system 2200 via storage device 2224 (e.g., a removable disk drive, a flash drive, etc.) and/or network interface device 2240. A network interface device, such as network interface device 2240, may be utilized for connecting computer system 2200 to one or more of a variety of networks, such as network 2244, and one or more remote devices 2248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2244, may employ a wired and/or a wireless mode of communication. In general, any network topology may be used. Information (e.g., data, software 2220, etc.) may be communicated to and/or from computer system 2200 via network interface device 2240.

Computer system 2200 may further include a video display adapter 2252 for communicating a displayable image to a display device, such as display device 2236. Examples of a display device include, but are not limited to, a liquid crystal display (LCD), a cathode ray tube (CRT), a plasma display, a light emitting diode (LED) display, and any combinations thereof. Display adapter 2252 and display device 2236 may be utilized in combination with processor 2204 to provide graphical representations of aspects of the present disclosure. In addition to a display device, computer system 2200 may include one or more other peripheral output devices including, but not limited to, an audio speaker, a printer, and any combinations thereof. Such peripheral output devices may be connected to bus 2212 via a peripheral interface 2256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Those skilled in the art will recognize improvements and modifications to the preferred embodiments of the present disclosure. To the extent that they would be obvious to one of ordinary skill in the power generation and distribution arts or other network or transportation arts, such improvements and modifications are considered within the scope of the concepts disclosed herein. Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A machine-readable storage medium containing machine-executable instructions for performing a method of managing line flows in a network having nodes with lines coupling adjacent ones of the nodes and components coupled to the nodes, the method being executed in a self-adjusting line flow control system, said machine-executable instructions comprising:
    a first set of machine-executable instructions for receiving an objective function having component variables, nodal output variables, and branch flow variables for the network;
    a second set of machine-executable instructions for initializing the component variables, nodal output variables and branch flow variables with initial values;
    a third set of machine-executable instructions for calculating values for the branch flow variables using a distributed Newton method, and calculating values for the component variables and the nodal output variables using values calculated for the branch flow variables until the values of the component variables, the nodal output variables, and the branch flow variables converge within a predetermined threshold range;

a fourth set of machine-executable instructions for determining a power flow configuration of the network as a function of one or more variables calculated by the third set of machine-executable instructions, wherein the determining of the power flow configuration includes determining a set of Lagrange multiplier values corresponding to nodal power balance at corresponding ones of the nodes;

a fifth set of machine-executable instructions for automatically determining whether or not the power flow configuration is feasible, wherein said fifth set of machine-executable instructions includes machine-executable instructions that determine whether or not any of the Lagrange multiplier values in the set of Lagrange multiplier values are not equal to zero;

a sixth set of machine-executable instructions for determining, when one or more of the Lagrange multiplier values are not equal to zero, adjustments to be made to power injections leaving or entering at the nodes so that the power flow configuration is feasible, wherein the determining includes identifying the specific nodes in the network where the power flow configuration is infeasible based on the ones of the Lagrange multiplier values that are not zero; and a seventh set of machine-executable instructions applying the adjustments to the network so as to manage the line flows in the lines of the network.

2. A machine-readable storage medium according to claim 1, further comprising machine-executable instructions for communicating one or more of the adjustments to one or more smart appliances for implementing said one or more of the adjustments.

3. A machine-readable storage medium according to claim 1, further comprising machine-executable instructions for communicating one or more of the adjustments to one or more system operators.

4. A machine-readable storage medium according to claim 1, further comprising machine-executable instructions for communicating one or more of the adjustments to one or more users utilizing the network.

5. A machine-readable storage medium according to claim 4, wherein the machine-executable instructions for communicating include machine-executable instructions for generating one or more of a short message service (SMS) text message or an e-mail.

6. A machine-readable storage medium according to claim 1, wherein said self-adjusting line flow control system comprises at least a portion of a power system for deep space exploration.

7. A machine-readable storage medium according to claim 1, wherein said self-adjusting line flow control system comprises at least a portion of a naval power system.

8. A machine-readable storage medium according to claim 1, wherein the determining of the power flow configuration utilizes a node-to-branch incidence matrix, said sixth set of machine-executable instructions includes machine-executable instructions for determining a change in nodal injections based on the node-to-branch incidence matrix and the set of Lagrange multiplier values.

9. A machine-readable storage medium according to claim 1, wherein the self-adjusting line flow control system comprises a plurality of line flow calculators associated correspondingly and respectively with the nodes, wherein said machine-executable instructions are configured for distributed execution by the plurality of line flow calculators.

10. A machine-readable storage medium according to claim 1, wherein a magnitude of each of the Lagrange multiplier values is proportional to a minimum change in a magnitude of power injection leaving or entering a corresponding one of the nodes required to satisfy Kirchoff's current law, wherein the adjustment to be made to the power injection is proportional to the magnitude of the corresponding non-zero Lagrange multiplier.

11. A machine-readable storage medium according to claim 1, wherein the determining of the power flow configuration further includes identifying a required adjustment in a reactance to one or more of the lines to provide a feasible power flow configuration.

12. A machine-readable storage medium containing machine-executable instructions for performing a method of managing line flows in a network having nodes with lines coupling adjacent ones of the nodes and components coupled to the nodes, the method being executed in a self-adjusting line flow control system, said machine-executable instructions comprising:

a first set of machine-executable instructions for monitoring a status of two or more of the nodes, lines, and components of the network;

a second set of machine-executable instructions for determining a power flow configuration as a function of the monitoring, wherein the determining of the power flow configuration includes determining Lagrange multipliers corresponding to nodal power balance at corresponding ones of the nodes;

a third set of machine-executable instructions for automatically determining whether or not the power flow configuration is feasible, wherein said third set of machine-executable instructions includes machine-executable instructions that determine whether or not any of the Lagrange multiplier values in the set of Lagrange multiplier values are not equal to zero;

a fourth set of machine-executable instructions for determining, when one or more of the Lagrange multiplier values are not equal to zero, adjustments to be made to power injections leaving or entering at the nodes so that the power flow configuration is feasible, wherein the determining includes identifying the specific nodes on the network where the power flow configuration is infeasible based on the ones of the Lagrange multiplier values that are not zero; and a fifth set of machine-executable instructions for applying the adjustments to the network so as to manage the line flows in the lines of the network.

13. A machine-readable storage medium according to claim 12, further comprising machine-executable instructions for communicating one or more of the adjustments to one or more smart appliances for implementing said one or more of the adjustments.

14. A machine-readable storage medium according to claim 12, further comprising machine-executable instructions for communicating one or more of the adjustments to one or more system operators.

15. A machine-readable storage medium according to claim 14, wherein the machine-executable instructions for communicating include machine-executable instructions for generating one or more of a short message service (SMS) text message or an e-mail.

16. A machine-readable storage medium according to claim 12, wherein said self-adjusting line flow control system comprises at least a portion of a power system for deep space exploration.

17. A machine-readable storage medium according to claim 12, wherein said self-adjusting line flow control system comprises at least a portion of a naval power system.

18. A machine-readable storage medium according to claim 12, wherein said first set of machine-executable instructions include machine-executable instructions for monitoring communications from two or more of the nodes, lines, and components of the network.

19. A machine-readable storage medium according to claim 12, wherein the determining of the power flow configuration utilizes a node-to-branch incidence matrix, said sixth set of machine-executable instructions includes machine-executable instructions for determining a change in nodal injections based on the node-to-branch incidence matrix and the set of Lagrange multiplier values.

20. A machine-readable storage medium according to claim 12, wherein the self-adjusting line flow control system comprises a plurality of line flow calculators associated correspondingly and respectively with the nodes, wherein said machine-executable instructions are configured for distributed execution by the plurality of line flow calculators.

* * * * *